United States Patent
Yamauchi et al.

(10) Patent No.: US 11,778,020 B2
(45) Date of Patent: Oct. 3, 2023

(54) COMPUTER SYSTEM AND SCALE-UP MANAGEMENT METHOD

(71) Applicant: Hitachi, Ltd., Tokyo (JP)

(72) Inventors: Yugo Yamauchi, Tokyo (JP); Mitsuo Hayasaka, Tokyo (JP); Takayuki Fukatani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/902,116

(22) Filed: Sep. 2, 2022

(65) Prior Publication Data
US 2023/0224362 A1 Jul. 13, 2023

(30) Foreign Application Priority Data
Jan. 12, 2022 (JP) ................................. 2022-003260

(51) Int. Cl.
*H04L 67/1029* (2022.01)
*H04L 67/1097* (2022.01)
*H04L 67/1008* (2022.01)

(52) U.S. Cl.
CPC ...... *H04L 67/1029* (2013.01); *H04L 67/1008* (2013.01); *H04L 67/1097* (2013.01)

(58) Field of Classification Search
CPC ............. H04L 67/1097; H04L 67/1008; H04L 67/1029
See application file for complete search history.

(56) References Cited

U.S. PATENT DOCUMENTS

| | | | |
|---|---|---|---|
| 8,738,333 B1 * | 5/2014 | Behera | G06F 9/5061 703/2 |
| 9,690,622 B1 * | 6/2017 | Argenti | G06F 9/5027 |
| 10,353,603 B1 * | 7/2019 | Baruch | G06F 3/0619 |
| 10,579,277 B1 * | 3/2020 | Shanmugam | G06F 3/0689 |
| 10,606,646 B1 * | 3/2020 | Christensen | G06F 9/5016 |
| 10,620,851 B1 * | 4/2020 | Shemer | G06F 16/122 |
| 10,621,019 B1 * | 4/2020 | Faulhaber, Jr. | G06N 5/04 |
| 10,979,436 B2 | 4/2021 | Lewis et al. | |
| 10,983,964 B1 * | 4/2021 | Bono | G06F 3/0659 |
| 11,487,591 B1 * | 11/2022 | Featonby | G06F 9/45558 |
| 11,574,243 B1 * | 2/2023 | Mallya Kasaragod | G06F 9/505 |

(Continued)

FOREIGN PATENT DOCUMENTS

| | | | |
|---|---|---|---|
| CN | 110825399 A * | 2/2020 | |
| WO | WO-2015197564 A1 * | 12/2015 | G06F 9/45533 |

(Continued)

*Primary Examiner* — Shean Tokuta
(74) *Attorney, Agent, or Firm* — Volpe Koenig

(57) ABSTRACT

It aims to make it possible to readily and rapidly scale up the server which executes one application. In a computer system which includes one or more compute server(s) which each has an application container which executes the one application and a management server which manages the compute server(s), the management server is configured to, in a case of increasing the number of the compute servers which each has the execution unit which executes the one application, specify a logic unit that a data unit that the execution unit of an existing compute server utilizes upon execution of an application is stored, and in a case where the execution unit of a newly added computer server executes the application, set the newly added compute server so as to refer to the specified logic unit.

8 Claims, 19 Drawing Sheets

(56) References Cited

U.S. PATENT DOCUMENTS

| | | | |
|---|---|---|---|
| 11,579,780 B1* | 2/2023 | Tsuchiya | G06F 3/0619 |
| 2016/0103714 A1* | 4/2016 | Konishi | G06F 9/5083 |
| | | | 718/105 |
| 2016/0205518 A1* | 7/2016 | Patel | H04L 41/0895 |
| | | | 455/518 |
| 2016/0349993 A1 | 12/2016 | Udupi et al. | |
| 2017/0257424 A1* | 9/2017 | Neogi | H04L 47/781 |
| 2018/0088993 A1* | 3/2018 | Gerdesmeier | G06F 9/5005 |
| 2018/0225155 A1* | 8/2018 | Watt, Jr. | G06F 9/5083 |
| 2019/0042320 A1* | 2/2019 | Prince | G06F 9/5077 |
| 2019/0052532 A1* | 2/2019 | Chen | H04L 41/0895 |
| 2019/0065323 A1* | 2/2019 | Dhamdhere | G06F 11/1484 |
| 2019/0102214 A1* | 4/2019 | Kondo | G06F 9/48 |
| 2019/0155633 A1* | 5/2019 | Faulhaber, Jr. | G06N 5/04 |
| 2019/0188094 A1* | 6/2019 | Ramamoorthi | G06F 11/203 |
| 2019/0235906 A1* | 8/2019 | Asawa | G06F 11/3433 |
| 2020/0110830 A1* | 4/2020 | Chen | G06F 16/27 |
| 2020/0192693 A1* | 6/2020 | Kawase | G06F 9/45558 |
| 2020/0225981 A1* | 7/2020 | Takahashi | G06F 9/4856 |
| 2021/0042141 A1* | 2/2021 | De Marco | G06F 8/656 |
| 2021/0141708 A1* | 5/2021 | Mathur | G06F 11/323 |
| 2021/0240734 A1* | 8/2021 | Shah | G06F 9/5072 |
| 2022/0057947 A1* | 2/2022 | Sangle | G06F 3/0644 |
| 2022/0091900 A1* | 3/2022 | Ito | G06F 9/5077 |
| 2022/0100548 A1* | 3/2022 | Ito | G06N 20/00 |
| 2022/0206873 A1* | 6/2022 | He | G06F 9/4881 |
| 2022/0322090 A1* | 10/2022 | Gorai | H04W 12/0433 |
| 2022/0335009 A1* | 10/2022 | Paul | G06F 16/11 |
| 2022/0374256 A1* | 11/2022 | Sasahara | G06F 9/45558 |
| 2022/0382879 A1* | 12/2022 | Kumar | G06N 5/02 |

FOREIGN PATENT DOCUMENTS

| | | | | |
|---|---|---|---|---|
| WO | WO-2019128984 A1 * | 7/2019 | | G06F 21/53 |
| WO | WO-2022056292 A1 * | 3/2022 | | |

\* cited by examiner

FIG. 7

| APPLICATION NAME (C201) | FILE PATH (C202) |
|---|---|
| APPLICATION 1 | /APP |
| ... | ... |

| DISTRIBUTED VOL ID (C101) | SERVER ID (C102) | MOUNT POINT (C103) |
|---|---|---|
| VOL 1 | SERVER A | /MNT/LU 1 |
| | SERVER B | /MNT/LU 2 |
| | SERVER C | /MNT/LU 3 |
| | SERVER D | /MNT/LU 4 |
| VOL 2 | SERVER B | /MNT/LU 5 |
| VOL 3 | SERVER C | /MNT/LU 6 |
| VOL 4 | SERVER D | /MNT/LU 7 |
| ... | ... | ... |

| SERVER ID | ROLE | IP ADDRESS | BMC ADDRESS | MTTF | STARTUP TIME |
|---|---|---|---|---|---|
| SERVER A | COMPUTE | 192.168.0.102 | 192.168.10.102 | 5 YEARS | 10 MIN |
| SERVER B | COMPUTE | 192.168.0.103 | 192.168.10.103 | 5 YEARS | 10 MIN |
| SERVER C | COMPUTE | 192.168.0.104 | 192.168.10.104 | 5 YEARS | 10 MIN |
| SERVER D | COMPUTE | 192.168.0.105 | 192.168.10.105 | 5 YEARS | 2 MIN |
| SERVER E | STORAGE | 192.168.0.106 | 192.168.10.106 | 5 YEARS | 100 MIN |
| SERVER F | STORAGE | 192.168.0.107 | 192.168.10.107 | 5 YEARS | 100 MIN |
| ... | ... | ... | ... | ... | ... |

| APPLICATION NAME | COMPUTE SERVER ID |
|---|---|
| APPLICATION 1 | SERVER A |
|  | SERVER B |
|  | SERVER C |
|  | SERVER D |
| ... | ... |

C401, C402 — T30

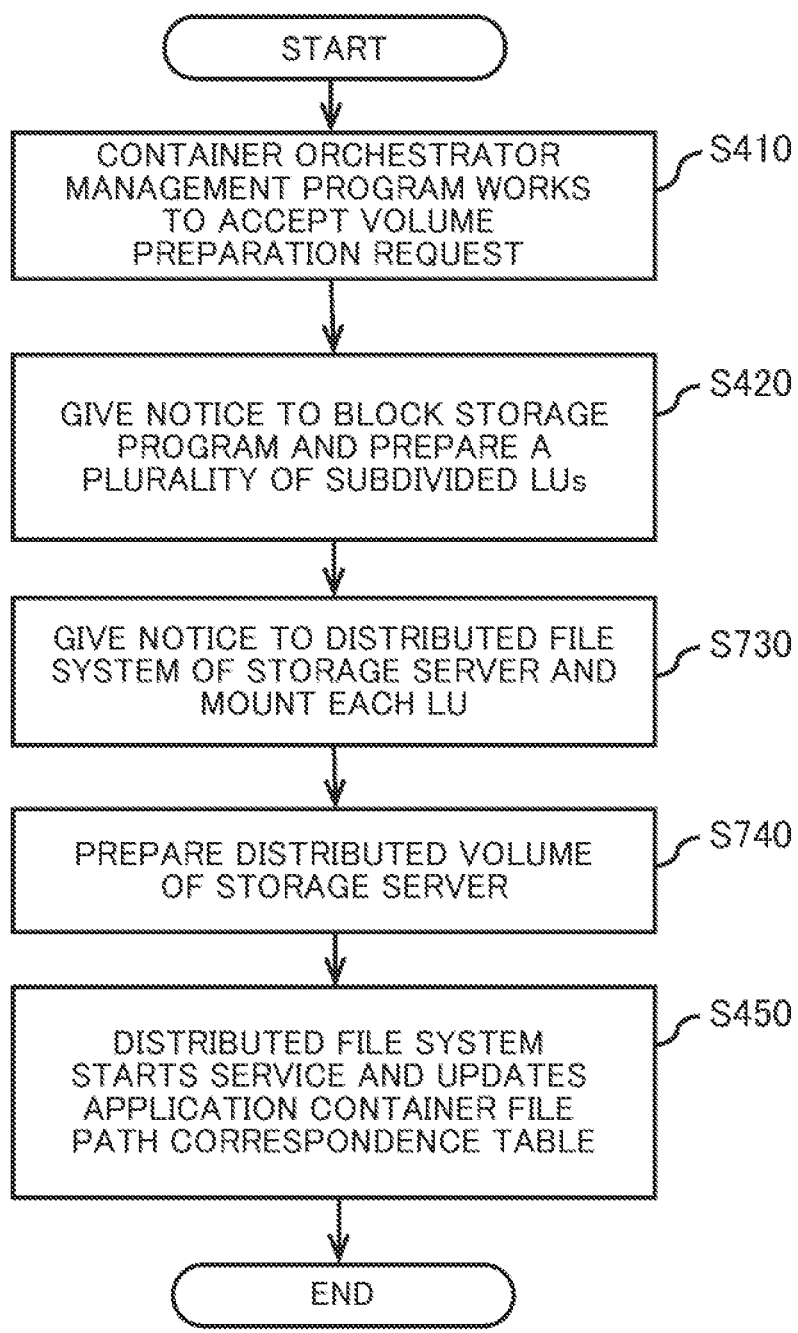

COMPUTER SYSTEM AND SCALE-UP MANAGEMENT METHOD

BACKGROUND

The present invention relates to a technology of scaling up compute servers which execute the same application.

Power saving of a system is requested aiming at realization of the carbon neutral society. Accordingly, there exists a request to stop an operation of an unnecessary server and to resume the operation of the server in a case where a load is increased and so forth. In addition, in a case where a VM (Virtual Machine) is operated beyond necessity, the cost is increased in a public cloud. Accordingly, there also exists a request to operate the necessary, sufficient and smaller number of compute servers/storage servers in accordance with the load on the system.

For example, there is known an auto-scaling technology of managing operations of containers which are configured to be used just like individual servers by putting together execution environments of applications (each of which is abbreviated as "app" in some cases) and thereby increasing/decreasing the number of the servers that an application container (an app container) uses, with deficiency in performance and resource shortage which occur in a case of operating the application in the container as a trigger (see U.S. Ser. No. 10/979,436). According to this technology, power saving is attained by decreasing the number of servers that the application runs and stopping the operations of these servers.

In addition, there is also known a technology that a distributed file system which stores files in a state of being distributed among a plurality of nodes calculates again placement of file data and thereby performs data rebalance that the file data is migrated between/among servers for effective utilization of resources of increased/decreased nodes in a case of executing auto-scaling (see Publication of US Patent Application 20160349993). Load fluctuation-dependent auto-scaling of the compute servers/storage servers is realized by combining the auto-scaling with the data rebalance.

SUMMARY

For example, in a case of performing the auto-scaling in accordance with load fluctuations, performance degradation of the system occurs due to frequent occurrence of data migration/replication. In addition, it is necessary to hold data which is necessary for the application which operates on the container in a file per container which is auto-scaled. Particularly, in a case where the size of the file is large, such an issue occurs that a load for replication of data in that file is large.

The present invention has been made in view of the above-described situations and aims to provide a technology of making it possible to readily and rapidly scale up the server which executes the application.

In order to attain the above-mentioned aim, according to one aspect of the present invention, there is provided a computer system including one or more compute server(s) which each has an execution unit which executes one application and a management server which manages the compute server(s), in which in a case of increasing the number of the compute servers which each has the execution unit which executes the one application, the management server specifies a logic unit that a data unit that the execution unit of an existing compute server utilizes upon execution of an application is stored, and in a case where the execution unit of a newly added computer server executes the application, the management server sets the newly added compute server so as to refer to the specified logic unit.

According to the present invention, it becomes possible to readily and rapidly scale up the server which executes the application.

BRIEF DESCRIPTION OF THE DRAWINGS

FIG. 7 is a configuration diagram illustrating one example of a configuration of an application container path correspondence table pertaining to the first embodiment.

FIG. 8 is a configuration diagram illustrating one example of a configuration of a distributed volume management table pertaining to the first embodiment.

FIG. 9 is a configuration diagram illustrating one example of a configuration of a server management table pertaining to the first embodiment.

FIG. 10 is a configuration diagram illustrating one example of a configuration of an application container arrangement table pertaining to the first embodiment.

FIG. 21 is a flowchart illustrating one example of a distributed volume preparation process pertaining to the second embodiment.

DETAILED DESCRIPTION

Figure 1:
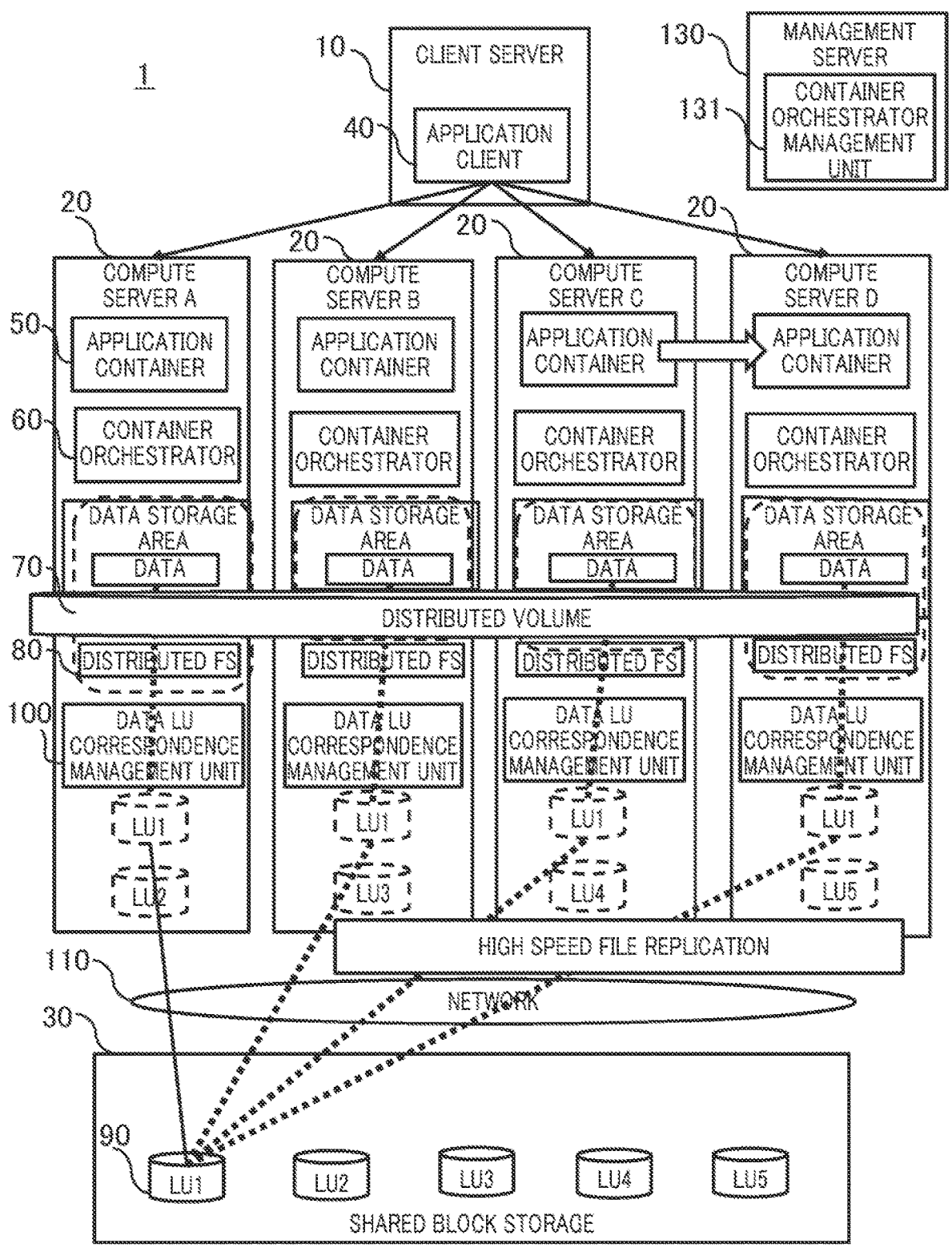
FIG. 1 is a diagram illustrating one example for description of an outline of a computer system according to the first embodiment.

Embodiments of the present invention will be described with reference to the drawings. Incidentally, the embodiments which will be described in the following do not limit the invention which pertains to What is Claimed Is and all various elements and combinations thereof which are described in the embodiments are not necessarily essential for issue solutions in the present invention.

Although, in the following, there are cases where information is described in expression of "AAA table", the information may be expressed in any data structure. That is, "AAA table" may be called "AAA information" in order to indicate that information does not depend on the data structure.

In addition, in the following description, a "network I/F" may include one or more communication interface device(s). The one or more communication interface device(s) may be one or more same type communication interface device(s) (for example, one or more NIC(s) (Network Interface Card(s)) and may be two or more interface devices of different types (for example, one or more NIC(s) and one or more HBA(s) (Host Bus Adapter(s)).

In addition, in the following description, a configuration of each table is one example and one table may be divided into two or more tables and all or some of the two or more tables may be one table.

In addition, in the following description, a storage device is a physical non-volatile storage device (for example, an auxiliary storage device) and may be, for example, an HDD (Hard Disk Drive), an SSD (Solid State Drive), an SCM (Storage Class Memory) and so forth.

In addition, in the following description, a memory may be either a volatile memory or a non-volatile memory.

In addition, in the following description, although there are cases where processing is described with a "program" being regarded as an agent of action, the program is executed by a processor (for example, a CPU (Central Processing Unit) and thereby the program works to execute prescribed processing while appropriately using at least one of a storage unit and an interface unit. Therefore, the processor (or a computer which has the processor) may be regarded as the agent of action of the processing. The program may be installed into the computer from a program source. The program source may be, for example, a program distribution server-readable or computer-readable recording medium. In addition, in the following description, two or more programs may be realized as one program and one program may be realized as two or more programs.

In addition, in the following description, ID (identification) is used as element identification information. However, also another kind of identification information may be used in place of or in addition to the ID.

In addition, in the following description, the distributed volume may be configured by one or more physical computer (s) (node(s)) and may further include a storage array. At least one physical computer may configure a virtual computer (for example, a VM (Virtual Machine)) and may configure an SDx (Software-Defined anything). The SDx may be, for example, an SDS (Software-Defined Storage) (one example of a virtual storage device) or an SDDC (Software-Defined Datacenter).

First, the outline of the first embodiment will be described.

FIG. 1 is a diagram illustrating one example for description of the outline of a computer system 1 according to the first embodiment. That is, FIG. 1 is the diagram for description of the outline of a method of auto-scaling application containers 50 in the computer system 1.

The computer system 1 has a client server 10, a plurality (in FIG. 1, four) of compute servers 20 (compute servers A to D), a shared block storage 30 and a management server 130.

Figure 2:
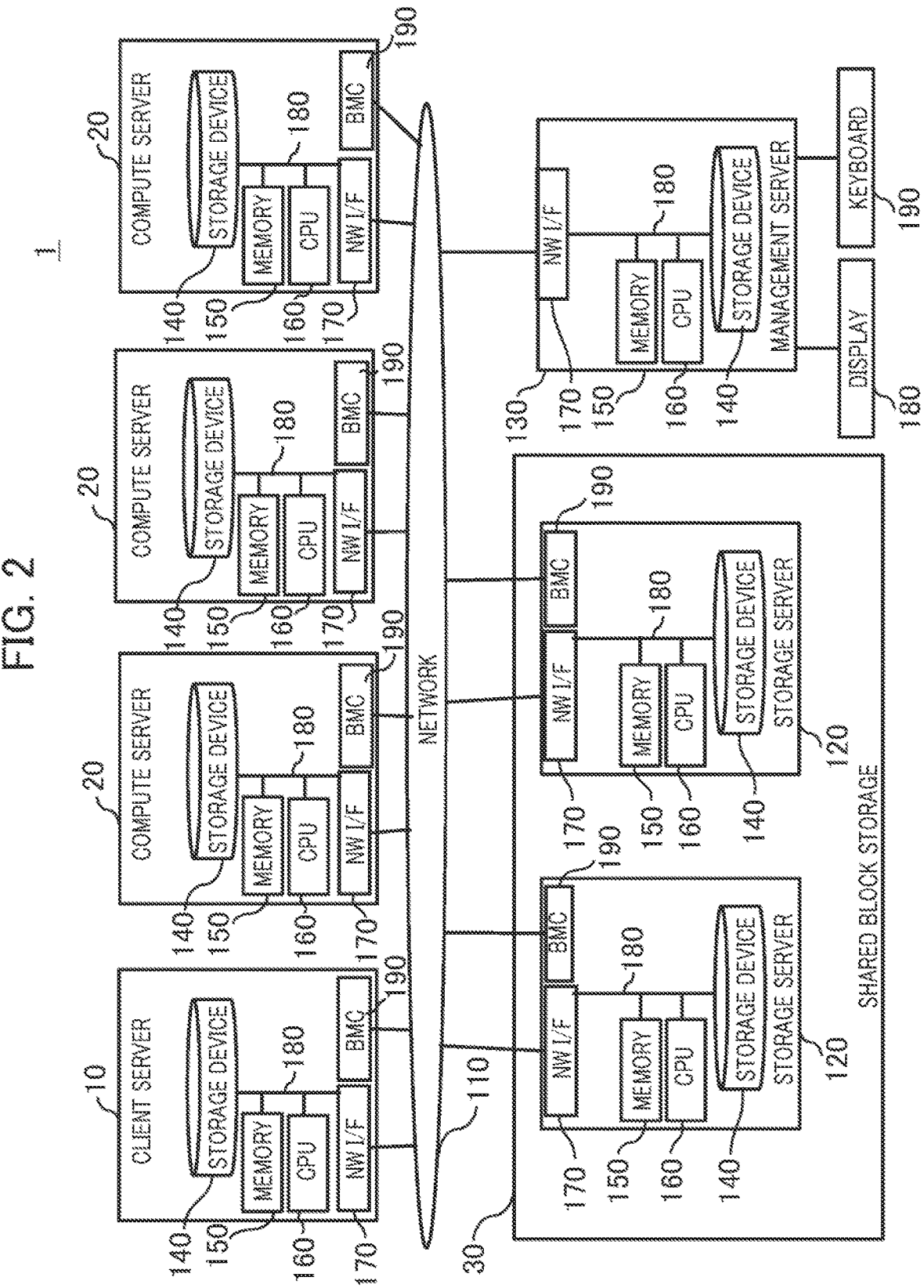
FIG. 2 is a configuration diagram illustrating one example of a configuration of the computer system according to the first embodiment.

The shared block storage 30 is configured by, for example, a plurality of storage servers 120 (see FIG. 2).

The management server 130 has a container orchestrater management unit 131. The container orchestrater management unit 131 manages a container orchestrater 60 of each compute server 20.

The client server 10 has an application client 40. The application client 40 allocates data to be processed to the plurality of application containers 50 which will be described later and makes each application container 50 execute a distribution process.

The compute server 20 has the container orchestrater 60, a distributed file system (distributed FS) 80 and a data LU (Logical Unit) correspondence management unit 100. Here, before execution of auto-scaling, three compute servers 20 (compute servers A to C) have the application containers 50 (one example of an execution unit) which execute the same application (also called app) and the compute server 20 (a compute server D) does not have the application container 50 which executes the same application.

The application container 50 executes one application and thereby executes processing on data which is allocated from the application client 40. Here, the application container 50 is the one which is configured to make it possible to use a computer (a server) just like its own server by putting application execution environments together on an OS (Operating System of the computer (the server). The container orchestrater 60 manages the containers such as the application container 50 and so forth. The distributed file system 80 prepares a distributed volume 70 which strides over the plurality of compute servers 20 by using a plurality of LUs (Logical Units) 90 which are prepared in a storage area of a storage device of the shared block storage 30 which is connected to the distributed file system 80 over a network 110. It is possible for the distributed file system 80 to prepare the plurality of LUs 90 in the storage area of the storage device of the shared block storage 30. Each compute server 20 stores a file (one example of a data unit) that the application container utilizes 50 in a data storage area on the distributed volume 70. The data LU correspondence management unit 100 manages the LU 90 that a file that the application container 50 uses is stored.

In the computer system 1, the container orchestrater 60 monitors a resource of the compute server 20 and the container orchestrater management unit 131 performs the auto-scaling of the application container 50, for example, in a case where the container orchestrator 60 detects that a CPU resource of the computer server 20 is tight. Specifically, the container orchestrater management unit 131 newly adds the application container 50 to the compute server 20 (the compute server D in FIG. 1). Thereby, the load is distributed to the respective application containers 50.

In a case of performing the auto-scaling, in the computer system 1, the container orchestrater management unit 131 specifies the LU 90 which is already stored to be used by the application container 50 as for a file that the added application container 50 uses. Then, the container orchestrator management unit 131 makes the computer server 20 which has the added application container 50 connect to the specified LU 90 on the shared block storage 30, for example, in a read only state. Thereby, it becomes possible for the added application container 50 to use data on that LU 90 with no need of data copying and thereby to realize file replication (file copying) at a high speed.

Next, the computer system 1 according to the first embodiment will be described in detail.

FIG. 2 is a configuration diagram illustrating one example of a configuration of the computer system 1 according to the first embodiment.

The computer system 1 includes the client server 10, one or more compute server(s) 20, the shared block storage 30 and the management server 130. The shared block storage 30 includes one or more storage server(s) 120.

The client server 10, the compute server(s) 20, the storage server(s) 120 and the management server 130 are mutually connected over the network 110. The network 110 may be, for example, a LAN (Local Area Network), a WAN (Wide Area Network) and so forth.

The client server 10 is a server that a user who executes predetermined processing uses and makes the plurality 20 of compute servers 20 execute the processing in a distributed state. The compute server 20 executes an application which is prepared for execution of the processing. The storage server 120 has a role to function as a block storage. The management server 130 manages the compute servers 20 and the storage servers 120.

Next, the computer server 20 will be described.

Figure 3:
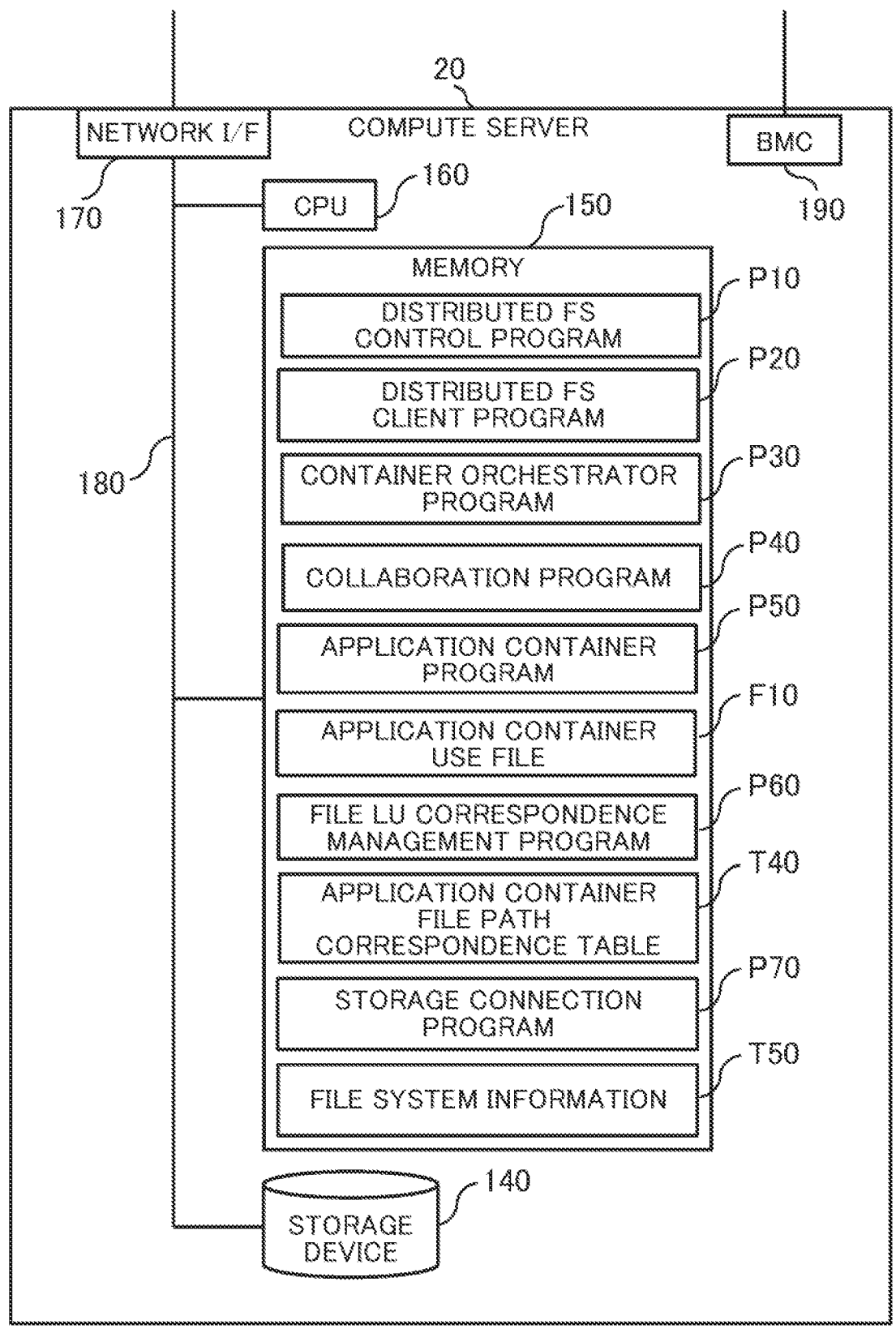
FIG. 3 is a configuration diagram illustrating one example of a configuration of a compute server pertaining to the first embodiment.

FIG. 3 is a configuration diagram illustrating one example of a configuration of the compute service 20 pertaining to the first embodiment.

The compute server 20 has a CPU 160 (Central Processing Unit) which is given as one example of a processor, a memory 150, a network interface (Network I/F) 170, a storage device 140 and a BMC (Baseboard Management Controller) 190. The CPU 160, the memory 150, the network interface 170 and the storage device 140 are mutually connected via an internal bus 180.

The network interface 170 is, for example, a wired LAN card, a wireless LAN card and so forth and communicates with other devices (for example, the client server 10, other compute servers 20, the storage server 120 and the management server 130) over the network 110.

The CPU 160 executes various kinds of processes in accordance with programs which are stored in the memory 150 and/or the storage device 140.

The storage device 140 is a non-volatile recording medium which stores various kinds of data and may be, for example, an HDD (Hard Disk Drive), an SSD (Solid State Drive), an SCM (Supply Chain Management) and so forth.

The BMC 190 makes it possible to control a power source of a device (the compute server 20 in the example in FIG. 3) which houses the BMC 190 from the outside. It is possible for the BMC 190 to operate independently of the CPU 160 and the memory 150 and thereby to perform power source control (ON/OFF control of the power source) of the device by accepting a power source control request which is made from the outside even in a case where defects occur in the CPU 160 and the memory 150.

The memory 150 is, for example, a RAM (Random Access Memory) and stores programs that the CPU 160 executes and necessary information. The memory 150 stores a distributed FS (File System) control program P10, a distributed FS client program P20, a container orchestrater program P30, a collaboration program P40, an application container program P50, an application container usage file F10, a file LU correspondence management program P60, an application container file path correspondence table T40, a storage connection program P70 and file system information T50. Incidentally, although not illustrated in FIG. 3, the memory 50 also storers a program which is necessary for the compute server 20 to function as a server of the OS and so forth.

The distributed FS control program P10 is used to configure the distributed volume 70 and to control the operation of the distributed FS 80 in cooperation with other computer servers 20. The distributed FS control program P10 works to execute a process that the compute server 20 stores the file which is stored in the distributed volume 70 into the LU 90 of the storage server 120. The CPU 160 executes the distributed FS control program P10 and thereby the distributed file system 80 is configured.

The distributed FS client program P20 works to execute a process of gaining access to the distributed volume 70 on the basis of another program in the compute server 20.

The container orchestrater program P30 works to start-up the container (the application container 50 and so forth) in the compute server 20) and to perform operation management of the container. In the first embodiment, the container orchestrater program P30 works to manage all the programs which work in the compute server 20 as the container. The CPU 160 executes the container orchestrator program P30 and thereby the container orchestrater 60 is configured.

The collaboration program P40 works to make it possible for the program in the compute server 20 which is managed on the basis of the container orchestrater program P30 to gain access to the distributed volume 70. The collaboration program P40 works to execute a process of providing the storage area from the distributed volume 70 in a case of receiving a request for utilization of the storage area from the container of the program which is managed on the basis of the container orchestrator program P30.

The application container program P50 works to execute a process by utilizing data which is given from the application client 40 which is set in the client server 10. The application container program P50 works to execute the process on the given data on the basis of a file which is necessary for execution of the process and to return a result of execution of the process to the application client 40. The CPU 160 executes the application container program P50 and thereby the application container 50 is configured.

The application container use file F10 is necessary for execution of the application container 50. The application container use file F10 is read out of, for example, the distributed volume 70.

The file LU correspondence management program P60 works to specify the LU 90 that the file is placed. The file LU correspondence management program P60 works to specify a file path of a data storage area in the application container 50 with reference to the application container file path correspondence table T40 in a case of increasing the number of application containers 50, to specify a necessary file from the specified file path and to specify the LU 90 that the file is placed on the basis of a file placement algorithm of the distributed FS control program P10 which is used to decide the LU 90 that the file is placed. The file placement algorithm may be, for example, an algorithm which is used to calculate a hash value on the basis of, for example, an identifier (a file name) of a file that data is stored and offset of the data in the file and to decide the LU 90 which stores the data on the basis of the hash value. Incidentally, although the file LU correspondence management program P60 is designed to specify the LU on 90 the basis of the algorithm, the file LU correspondence management program P60 may be designed to, for example, manage a table which stores a correspondence relation between the file and the LU 90 and to specify the LU 90 on the basis of the table, not limited to the program which is designed as mentioned above. The CPU 160 executes the file LU correspondence management program P60 and thereby the data LU correspondence management unit 100 is configured.

The storage connection program P70 works to execute a process of connecting the compute server 20 to the LU 90 of the shared block storage 30.

The application container file path correspondence table T40 is used to manage a file path which is used in the application container 50.

The file system information T50 is used to store information on configurations of a directory and a file in the distributed FS 80.

Next, the storage server 120 will be described.

Figure 4:
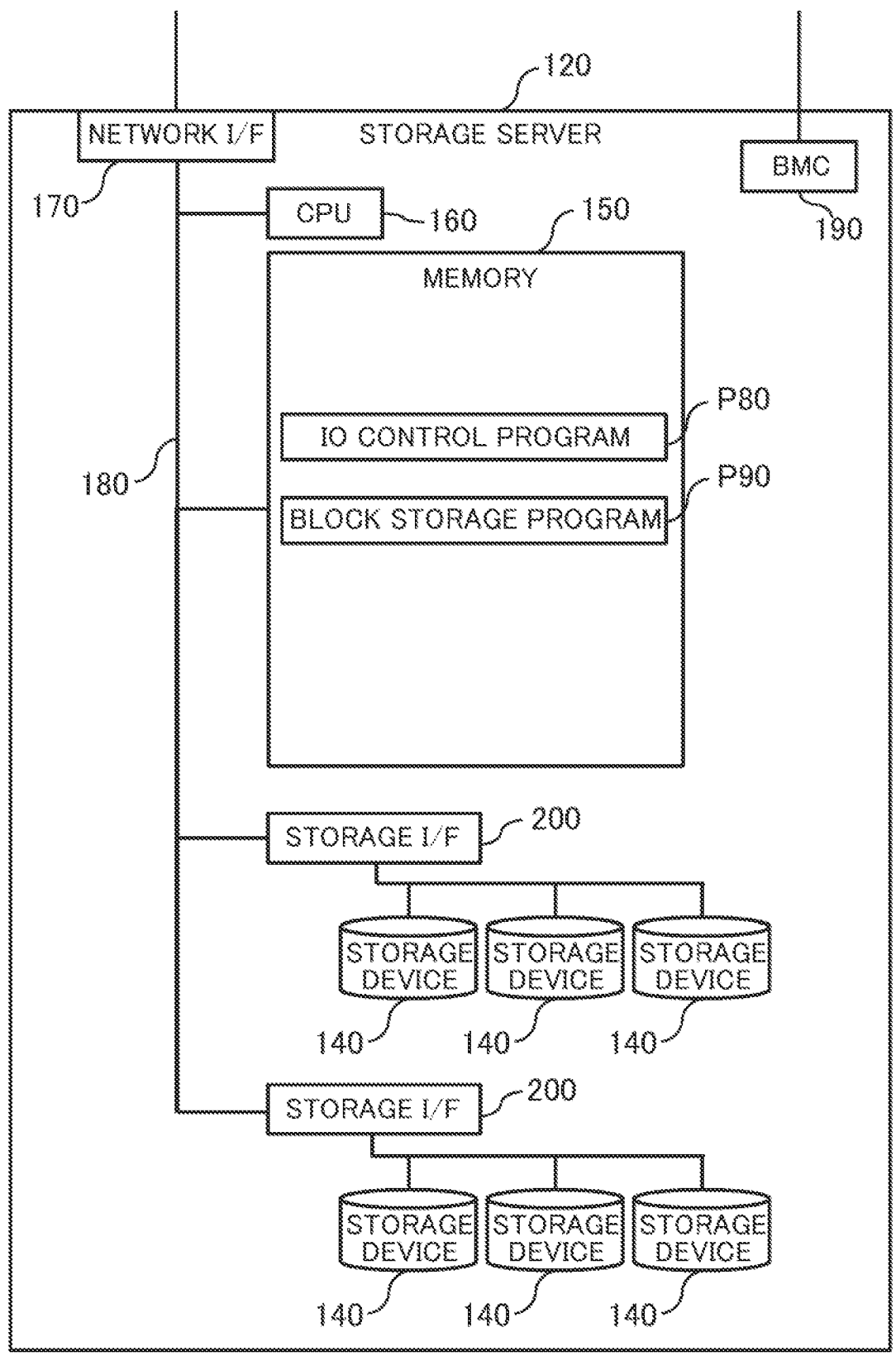
FIG. 4 is a configuration diagram illustrating one example of a configuration of a storage server pertaining to the first embodiment.

FIG. 4 is a configuration diagram illustrating one example of a configuration of the storage server 120 pertaining to the first embodiment.

The storage server 120 has the CPU 160 which is given as one example of the processer, the memory 150, the network interface 170, one or more storage interface(s) (Storage I/F) 200, the plurality of storage devices 140 (one example of a block device) and the BMC 190. The CPU 160, the memory 150, the network interface 70 and the storage interface 200 are mutually connected via the internal bus 180.

The storage interface 200 connects the CPU 160 with the storage device 140. It is possible for the CPU 160 to read/write data out of/into the storage device 140 via the storage interface 200. It is possible to use an FC (Fiber channel), a SATA (Serial Attached Technology Attachment), a SAS (Serial Attached SCSI (Small Computer System Interface)), an IDE (Integrated Device Electronics) and so forth for communication between the CPU 160 and the storage interface 200.

The memory 150 of the storage server 120 stores an IO control program P80 and a block storage program P90. Incidentally, although not illustrated in the drawing, the memory 150 also stores a program which is necessary to function as a server of the OS and so forth.

The IO control program P80 is designed to perform data reading/writing out of/into the storage device 140 in accordance with an I/O request to the LU 90 which is received over the network 110. The block storage program P90 is designed to configure and control the shared block storage 30 in cooperation with other storage servers 120.

The storage device 140 of the storage server 120 stores user data and control information which are stored by the compute server 20 in addition to various kinds of programs which are used in the storage server 120.

Next, the management server 30 will be described.

Figure 5:
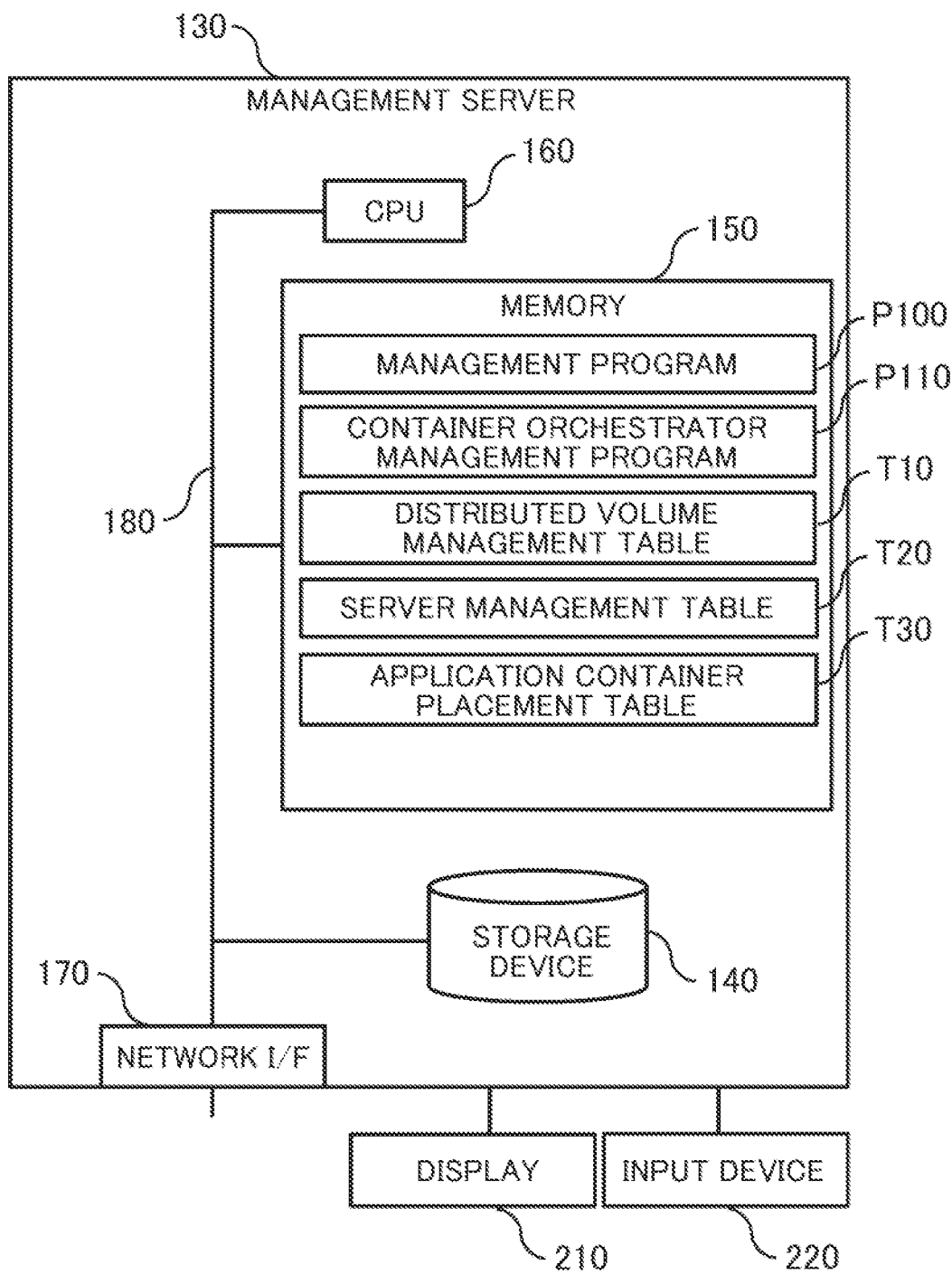
FIG. 5 is a configuration diagram illustrating one example of a configuration of a management server pertaining to the first embodiment.

FIG. 5 is a configuration diagram illustrating one example of a configuration of the storage server 130 pertaining to the first embodiment.

The management server 130 has the CPU 160 which is given as one example of the processor, the memory 150, the network interface 170 and the storage device 140. The CPU 160, the memory 150, the network interface 170 and the storage device 140 are mutually connected via the internal bus 180. A display 210 and an input device 220 are connected to the management server 130.

The memory 150 of the management server 130 stores a management program P100, a container orchestrater management program P110, a distributed volume management table T10, a server management table T20 and an application container placement table T30. Incidentally, although not illustrated in the drawing, the memory 150 stores also a program which is necessary to function as a server of the OS and so forth.

The management program P100 works to issue a configuration change request to the compute server 20 and the storage server 120 in accordance with a management request which is input from a manager. The management request includes, for example, a request to increase the number of the servers 20 and 120, a request to decrease the number of the servers 20 and 120 and so forth. The configuration change request to the storage server 120 includes, for example, requests for preparation, deletion, expansion and reduction of LUs 90 and requests for addition, deletion and change of LU paths.

The container orchestrater management program P110 works to issue requests to manage preparation, expansion, deletion, activation, stopping and so forth of the application containers 50 to the container orchestrater 60 of the compute server 20 and the storage server 120. The CPU 160 executes the container orchestrater management program P110 and thereby the container orchestrater management unit 131 is configured.

The display 210 displays and outputs various kinds of information such as a management screen that the manager uses for management of the compute servers 20 and the storage servers 120, a distribution process application management screen I100 (see FIG. 15) which is used to manage the application and so forth. The input device 220 is, for example, a keyboard, a mouse, a touch panel and so forth and accepts an operation input from the manager.

Next, the client server 10 will be described.

Figure 6:
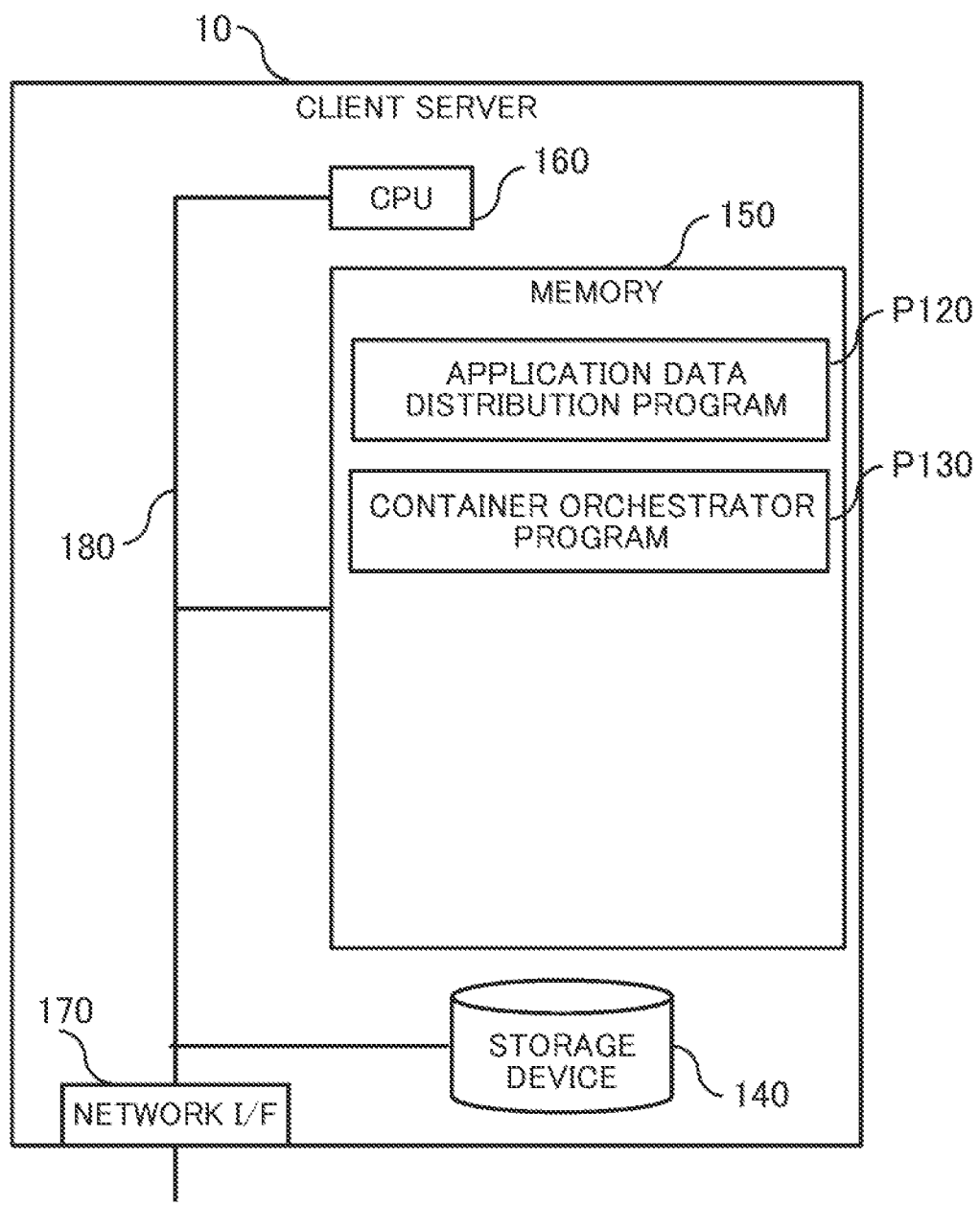
FIG. 6 is a configuration diagram illustrating one example of a configuration of a client server pertaining to the first embodiment.

FIG. 6 is a configuration diagram illustrating one example of a configuration of the client server 10 pertaining to the first embodiment.

The client server 10 has the CPU 160 which is given as one example of the processor, the memory 150, the network interface 170 and the storage device 140. The CPU 160, the memory 150, the network interface 170 and the storage device 140 are mutually connected via the internal bus 180.

The memory 150 of the client server 10 stores an application data dispatch program P120 and a container orchestrater program P130. Incidentally, although not illustrated in the drawing, also a program which is necessary for the client server 10 to function as the server of the OS and so forth is stored in the memory 150.

The application data dispatch program P120 works to transmit data which is necessary for execution of the process to the application container program P50 of the compute server 20 over the network 110 and to receive a result of execution of the process from the compute server 20. In this case, the application data dispatch program P120 works to acquire information which is listed in the application container placement table T30 of the management server 130 on the basis of the container orchestrater program P130, to specify one or more compute server(s) 20 which has/have the application container(s) 50 which make(s) it possible to execute an application for executing the process with reference to the information which is listed in the application container placement table T30 and to dispatch data to the specified compute server(s) 20 in a distributed state.

The container orchestrator program p130 works to acquire the information which is listed in the application container placement table T30 of the management server 130 in accordance with an instruction which is issued on the basis of the application data dispatch program P120.

Next, the application container file path correspondence table T40 will be described.

FIG. 7 is a configuration diagram illustrating one example of a configuration of the application container file path correspondence table T40.

The application container file path correspondence table T40 is used to manage each file path which is used in each application container 50. The application container file path correspondence table T40 stores application-based entries and the same entry corresponds to the plurality of application containers 50 which execute the same application in the distributed state. The entry in the application container file path correspondence table T40 contains fields of Application Name C201 and File Path C202. The name (the application name) of the application which corresponds to the entry is stored in Application Name C201. The file path of the distributed file system 80 in the application which corresponds to the entry is stored in File Path C202.

In the first embodiment, values which are obtained by execution of the collaboration program P40 are stored into Application Name C201 and File Path C202 in the application container file path correspondence table T40 in a case where the collaboration program P40 works to prepare the application container 50 and the data storage area which corresponds to the application container 50 and which is located on the distributed volume 70.

Next, the distributed volume management table T10 will be described.

FIG. 8 is a configuration diagram illustrating one example of a configuration of the distributed volume management table T10 pertaining to the first embodiment.

The distributed volume management table T10 is used to manage information on the distributed volume. The entry which corresponds to the distributed volume is stored in the distributed volume management table T10. The entry of the distributed volume management table T10 contains fields of Distributed Vol ID C101, Server ID C102 and Mount Point C103.

Identification information (the distributed volume ID) of the distributed volume which corresponds to the entry is stored in Distributed Vol ID C101. The ID (server ID) of the storage server 120 which configures a storage area of the distributed volume which corresponds to the entry is stored in Server ID C102. A point (a mount point) that the distributed volume which corresponds to the entry is mounted is stored in Mount Point C103

In preparation of the distributed volume, the container orchestrater program P30 works to instruct the distributed FS control program P10 and thereby values are stored into Distributed Vol ID C101, Server ID C102 and Mount Point C103 in the distributed volume management table T10.

Next, the server management table T20 will be described.

FIG. 9 is a configuration diagram illustrating one example of a configuration of the server management table T20 pertaining to the first embodiment.

The server management table T20 is used to manage information on the servers (the compute servers 20, the storage servers 102). A server-based entry is stored in the server management table T20. The entry in the server management table T20 includes fields of Server ID C301, Role C302, IP Address C303, BMC Address C304, MTTF (Mean Time To Failure) C305 and Start-Up Time C306. The ID of the server which corresponds to the entry is stored in Server ID C301. The role of the server which corresponds to the entry, that is, information which indicates whether the server is the compute server 20 or the storage server 120 is stored in Role C302. The IP address of the server 20 or 120 which corresponds to the entry is stored in IP Address C303. The IP address (BMC address) of the BMC 190 of the server which corresponds to the entry is stored in BMC Address C304. MTTF (Mean Time To Failure) of the server which corresponds to the entry is stored in MTTF C305. The start-up time of the server which corresponds to the entry is stored in Start-Up Time C306.

In the server management table T20, the entry and values in the fields of the entry are stored on the basis of the management program P100 in a case where the number of the servers is increased or decreased.

Next, the application container placement table T30 will be described.

FIG. 10 is a configuration diagram illustrating one example of a configuration of the application container placement table T30 pertaining to the first embodiment.

The application container placement table T30 is used to manage information on placement of the application container 50 in the compute server 20. The application container placement table T80 includes the entry which corresponds to the application which configures the application container 50. The entry of the application container placement table T3 includes fields of Application Name C401 and Compute Server ID C402.

The name (the application name) of the application which corresponds to the entry is stored in Application Name C401. The server ID of the compute server 20 which has the application container 50 which executes the application which corresponds to the entry is stored in Compute Server ID C402.

In the application container placement table T30, the entry and values in the fields of the entry are stored on the basis of the container orchestrater management program P110 in a case where the application container 50 is added to the compute server 20. In a case of auto-scaling the application containers 50, the container orchestrater management program P110 works to specify one compute server 20 which does not start up the application container 50 which executes an application which is to be executed with reference to the application container placement table T30 and the server management table T20 and to start up the application container 50 in this compute server 20.

Next, processing operations in the computer system 1 will be described.

First, scaling-out processing of scaling out the application containers 50 will be described.

Figure 11:
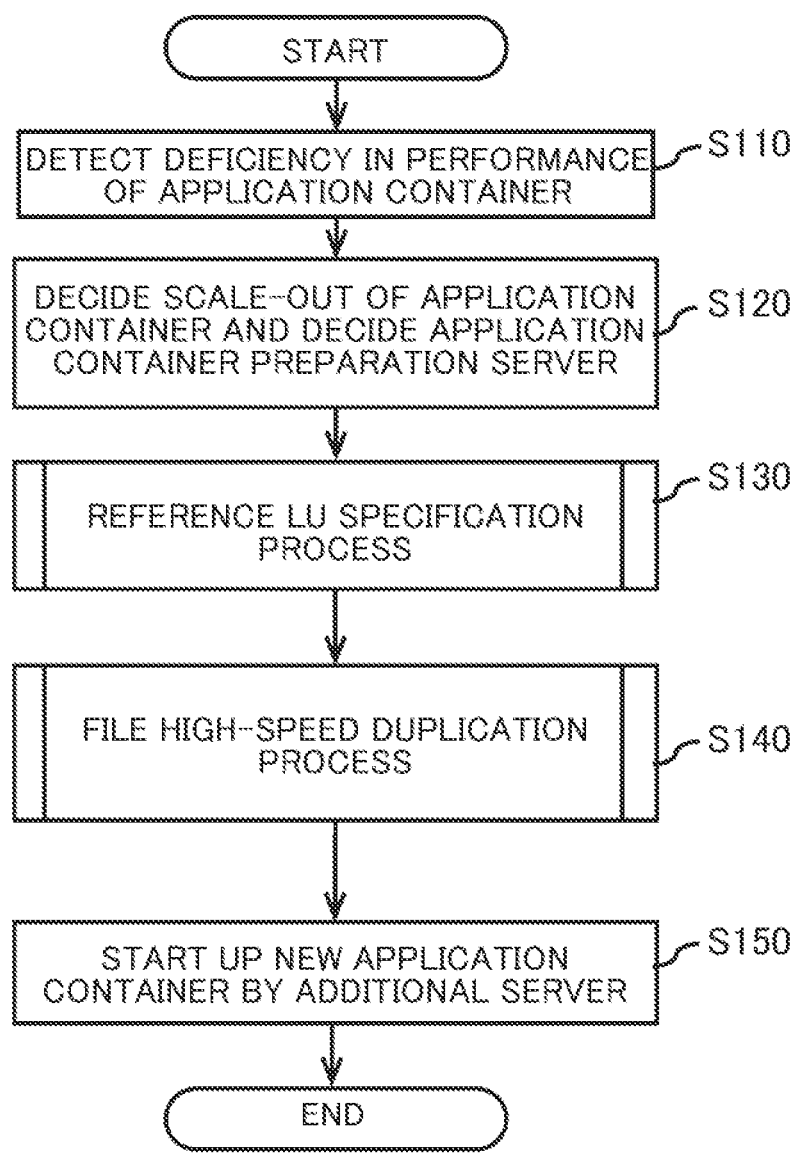
FIG. 11 is a flowchart illustrating one example of scaling-out processing according to the first embodiment.

FIG. 11 is a flowchart illustrating one example of the scaling-out processing according to the first embodiment.

The container orchestrater management program P110 (strictly speaking, the CPU 160 of the management server 130 which executes the container orchestrater management program P110) of the management server 130 works to accept usage rate (load information)/performance information on the CPU 160 from the container orchestrater program P30 of each compute server 20 and to detect deficiency in performance and resource shortage of the application container 50 in the compute server 20 (step S110). Incidentally, the container orchestrater program P30 of the compute server 20 works to appropriately acquire the usage rate/performance information on the CPU 160 of the compute server 20 that the program P30 itself works.

Here, in a case where the deficiency in performance and the resource shortage of the application container 50 in the compute server 20 are detected, processes in step S120 and succeeding steps are executed. In a case where the deficiency in performance and the resource shortage of the application container 50 in the compute server 20 are not detected, execution of the scaling-out processing is terminated.

In step S120, the container orchestrater management program P110 of the management server 130 works to decide one compute server 20 that the application container 50 which executes the application which is the same as the application of the application container 50 (the target application container) which is to be scaled-out is not started up as the compute server 20 for which the application container 50 is prepared for scaling-out from the compute servers 20 in the computer system 1, with reference to the server management table T20 and the application container placement table T30.

Then, the container orchestrater management program P110 works to execute a reference LU specification process (see FIG. 12) and thereby to specify the LU 90 which stores the file that the target application container 50 utilizes (step S130).

Then, the container orchestrater management program P110 works to execute a file high-speed replication process (see FIG. 13) and thereby to replicate the file such that it becomes possible for a new application container 50 which is prepared to utilize the file (step S140).

Then, the container orchestrater management program P110 works to transmit an instruction to newly start up the application container 50 which executes the application which is the same as the application of the target application container 50 to the container orchestrater program P30 of the compute server 20 which is decided in step S120 (step S150). As a result, the container orchestrater program P30 works to newly start up the application container 50. Thereby, it becomes possible for the started-up application container 50 to gain access to the specified LU 90 in the read only state and to execute the process. Then, as a result, the application client 40 executes the process by utilizing all the application containers 50 which execute the same application, including the application container 50 which is prepared for the scaling-out processing.

Incidentally, although in the scaling-out processing in FIG. 11, an example that the application container 50 is scaled out on the basis of detection of the deficiency in performance of resources such as the CPU 160 and so forth in each application container 50 is shown, this example is merely illustrative and, instead, the application container 50 may be scaled out in accordance with an instruction from the manager or the user.

In addition, although in the above example, a situation that the new application container 50 which is prepared by executing the auto-scaling processing gains access to the LU 90 in the read-only state is supposed, this situation is merely illustrative and, for example, one new application container 50 may store updated data on the read-only LU 90 in another area and the LU 90 may be used as a substantially updatable LU by merging the updated data in another area and the data on the LU 90 together.

In addition, in a case where one application container 50 is newly started up, the container orchestrater management program P110 may work to store information that the application container 50 which is newly started up is set in one-to-one correspondence with a time that the application container 50 is started up (the time that the auto-scaling processing is executed) in the memory 150 and to manage the information.

Next, the reference LU specification process in step S130 will be described.

Figure 12:
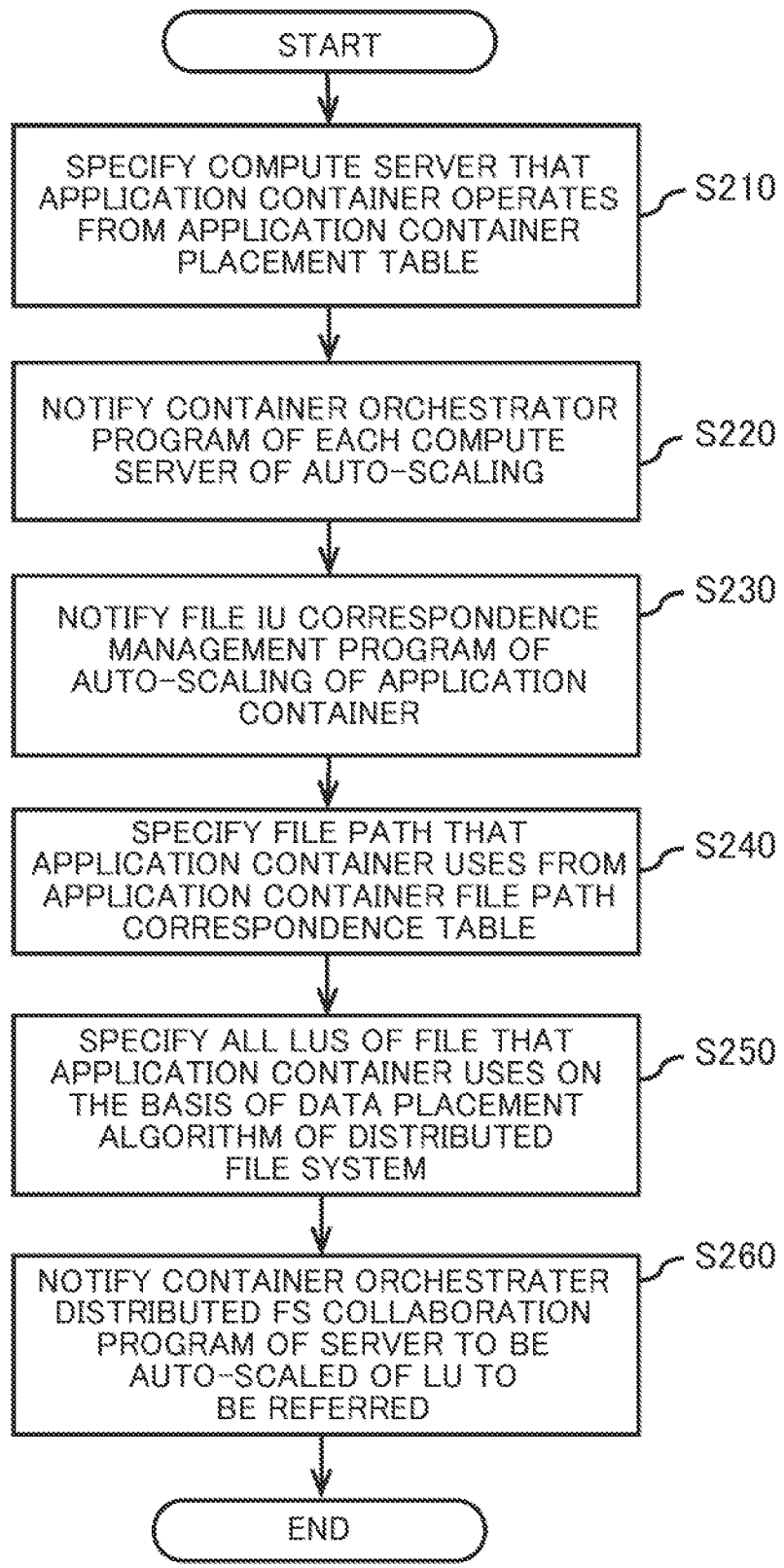
FIG. 12 is a flowchart illustrating one example of a reference LU specification process pertaining to the first embodiment.

FIG. 12 is a flowchart illustrating one example of the reference LU specification process in the scaling-out processing according to the first embodiment.

The container orchestrater management program P110 of the management server 130 works to specify one compute server 20 that the application container 50 which is to be auto-scaled operates with reference to the application container placement table T30 (step S210).

Then, the container orchestrater management program P110 works to notify the container orchestrater program P30 of each specified computer server 20 of auto-scaling of the application container 50 (step S220). Then, the container orchestrater P30 of each specified compute server 20 works to notify the file LU correspondence management program P60 of the auto-scaling of the number of the application containers 50 (step S230).

The file LU correspondence management program P60 works to specify the file path that the target application container 50 uses with reference to the application container file path correspondence table T40 (step S240).

Then, the file LU correspondence management program P60 works to specify all the LUs 90 of the file that the application container 50 uses on the basis of a data placement algorithm of the distributed file system 80 (step S250). Specifically, the file LU correspondence management program P60 works to specify all the files which are present under a file path which is specified in step S240 with reference to the file system information T50 and to specify the LU 90 that each specified file is placed on the basis of the data placement algorithm.

Then, the file LU correspondence management program P60 of each compute server 20 works to notify the collaboration program P40 of the computer server 20 which is to be auto-scaled so as to refer to the LU 90 that the file is stored from the application container 50 which is newly prepared (step S260).

Incidentally, although in the example of the reference LU specification process in FIG. 12, all the LUs 90 in all the files that the application container 50 uses are specified, the present invention is not limited to this configuration and, for example, the LU 90 for the file the replication of which is necessary for each application which is designated by the manager may be specified.

Next, the file high-speed replication process in step S140 will be described.

Figure 13:
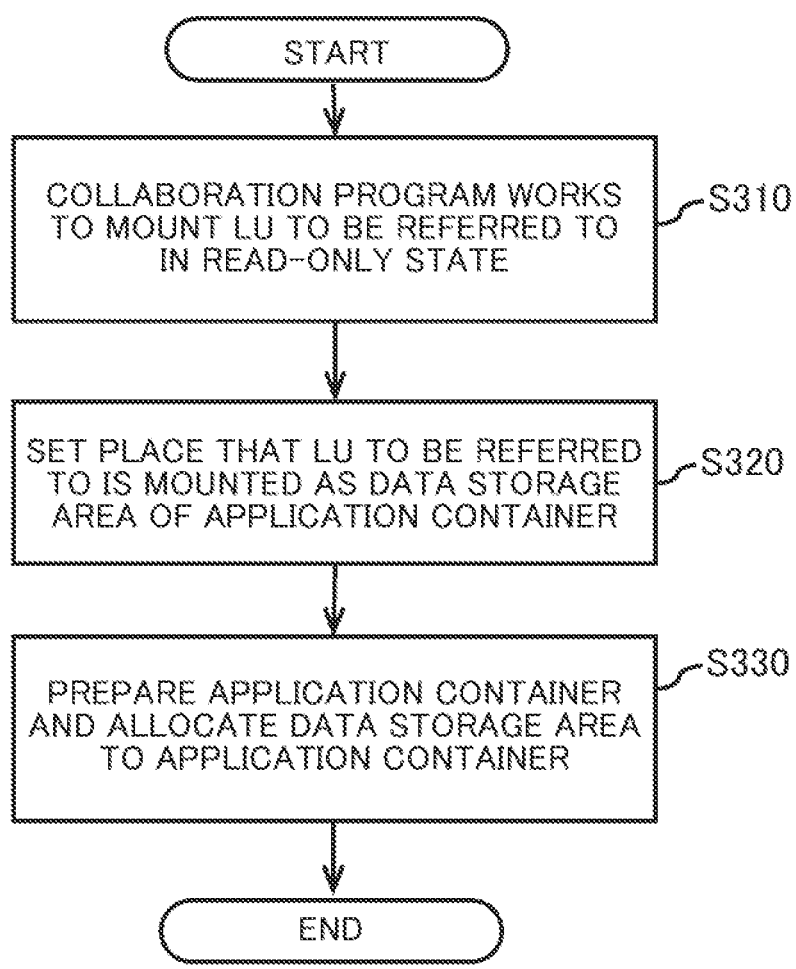
FIG. 13 is a flowchart illustrating one example of a file high-speed replication process pertaining to the first embodiment.

FIG. 13 is a flowchart illustrating one example of the file high-speed replication process in the auto-scaling processing according to the first embodiment.

The collaboration program P40 of the compute server 20 which operates the application container 50 to be scaled-out works to receive the notification in step S260 and to mount the LU 90 which is instructed to refer to in the notification on the compute server 20 in the read only state (step S310). Specifically, the collaboration program P40 works to instruct the storage connection program P70 so as to connect the instructed LU 90 on the shared block storage 30 to the compute server 50 in the read-only state.

Then, the collaboration program P40 works to set a place that the LU 90 is mounted in step S310 as a new data area (volume) that the application container 50 is file-accessible (step S320).

Then, the collaboration program P40 works to prepare the application container 50 and to allocate the new data area which is set in step S320 to the application container 50 (step S330). Thereby, it becomes possible for the application container 50 to refer to the LU 90 that the file which is used via the new data area is stored in the read only state and to execute the process which is allocated from the application client 40.

Next, a distributed volume preparation process will be described.

Figure 14:
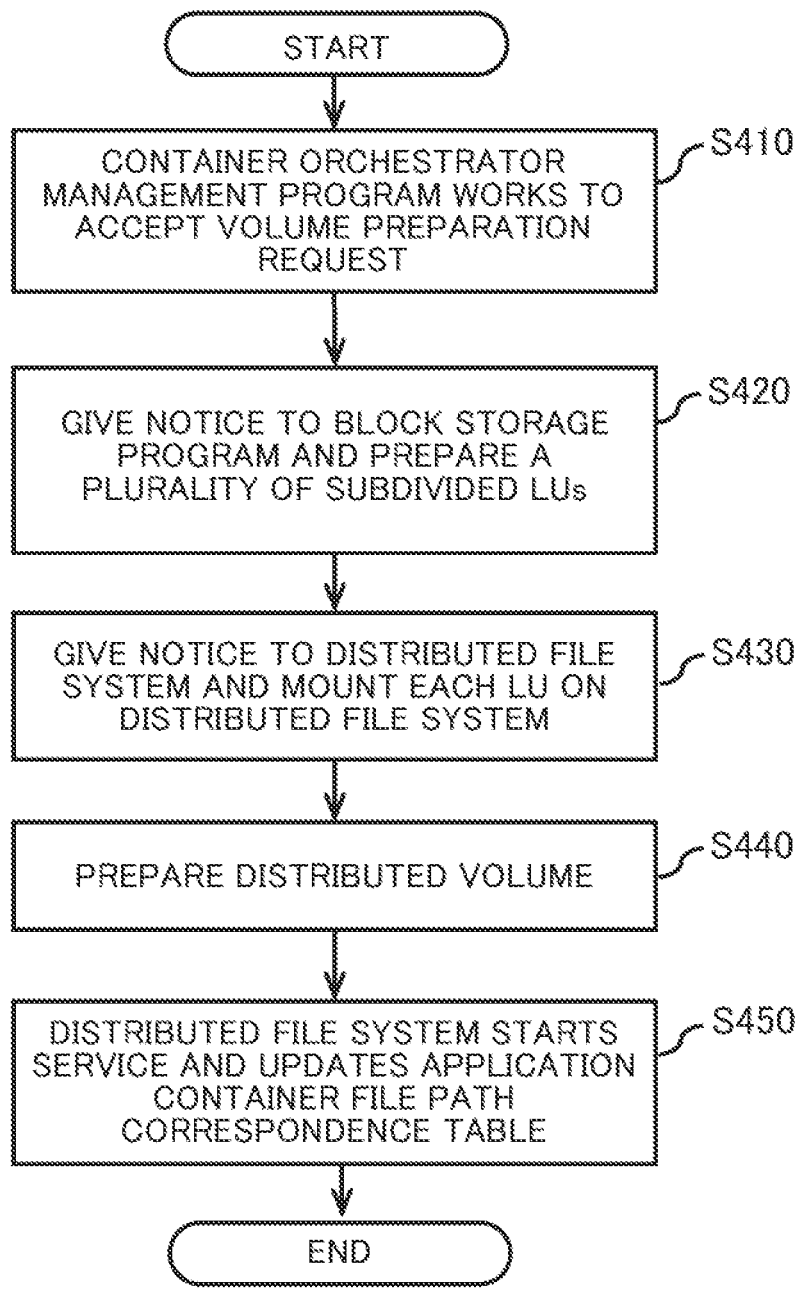
FIG. 14 is a flowchart illustrating one example of a distributed volume preparation process pertaining to the first embodiment.

FIG. 14 is a flowchart illustrating one example of the distributed volume preparation process pertaining to the first embodiment.

The container orchestrater management program P110 of the management server 130 works to accept a request for preparation of the data storage area (volume) from the manager (step S410).

Then, the container orchestrater management program P110 works to notify the container orchestrater 60 of the compute server 20 of the request for preparation of the data storage area, the container orchestrater 60 hands over the request for preparation of the data storage area to the collaboration program P40, the collaboration program P40 works to notify the block storage program P90 of preparation of the LU 90 and the block storage program P90 works to prepare a predetermined number (a plurality) of subdivided LUs 90 (step S420). Here, the number of the LUs 90 to be prepared is merely illustrative and the number of the LUs 90 may be decided depending on a requested data volume and so forth. In addition, the size of the LU 90 may be decided to be less than a predetermined data volume.

Then, the collaboration program P40 works to add (mount) the prepared LUs 90 to/on the distributed file system 80 (step 430).

Then, the collaboration program P40 works to prepare the distributed volume 70 and to add the entry of the prepared distributed volume 70 to the distributed volume management table T10 (step S440).

Then, the distributed file system 80 (the distributed FS control programs P10 of the plurality of compute servers 20) launches a service and the collaboration program P40 works to update the entry which corresponds to a volume allocation application in the application container file path correspondence table T40 (step S450).

It becomes possible to reduce the size of each LU 90 by execution of this distributed volume preparation process. Therefore, for example, in a case of reducing the number of the servers 20, it becomes possible to readily and appropriately allocate the LUs 90 which store data that the server 20 holds to remaining servers 20 so as to avoid concentration of the load on the server 20.

Next, the distribution process application management screen I100 will be described. The distribution process application management screen I100 is displayed and output on the basis of the container orchestrater management program P110.

Figure 15:
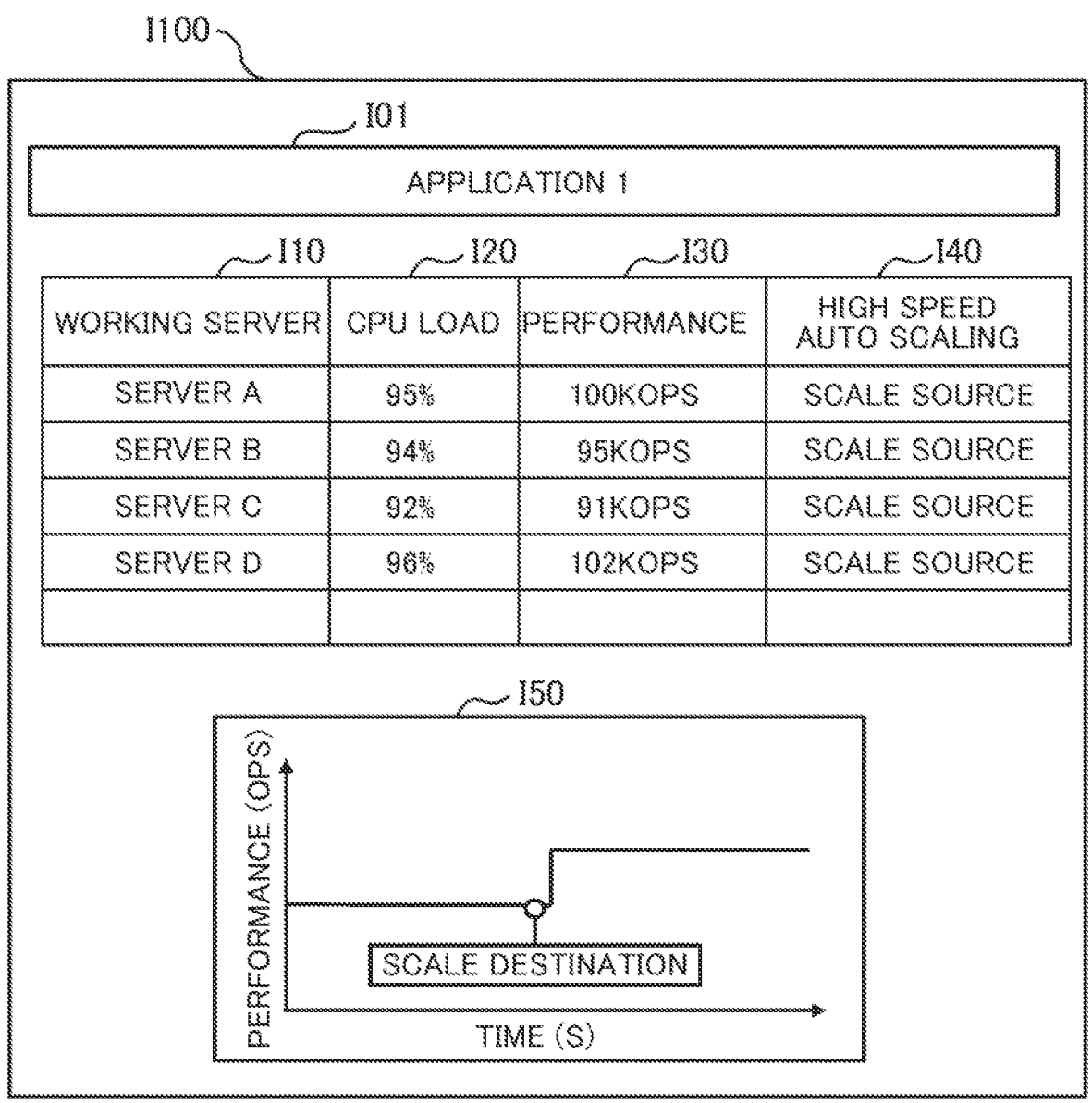
FIG. 15 is a configuration diagram illustrating one example of a configuration of a distribution process application management screen pertaining to the first embodiment.

FIG. 15 is a configuration diagram illustrating one example of a configuration of the distribution process management screen I100 pertaining to the first embodiment.

The distribution process application management screen I100 includes an application container identifier display area I01, a working server display area I10, a CPU load display area I20, a performance display area I30, a high-speed auto-scaling display area I40 and a performance graph display area I50.

An identifier (for example, the name of the application that the application container 50 executes) of the application container 50 which executes the distribution process which is to be displayed on the distribution process application management screen I100. The name of the server (the compute server 20) that the application container to be displayed works is displayed in the working server display area I10. Information on the loads on the CPUs 160 in the servers 20 which are arrayed on the same row is displayed in the CPU load display area I20. Output performances (OPS: Operations Per Second) of the servers 20 which are arrayed on the same row are displayed in the performance display area I30. Whether the servers 20 on the same row are scaling sources or scaling destinations of the auto-scaling is displayed in the high-speed auto-scaling display area I40. A graph of a time-dependent change of a total value of the output performances (OPS) of all the compute servers 20 which work the application containers 50 to be displayed is displayed in the performance graph display area I50. Also, a timing that the auto-scaling is executed is displayed in that graph and it becomes possible to grasp a change in performance of all the compute servers 20 which have the application containers 50 to be displayed before and after execution of the auto-scaling.

It becomes possible for the manager to confirm the output performance of the server 20 which has the application container 50 which is subjected to high-speed auto-scaling, the load on each CPU 160, the number of the servers 20 which work, the effect of the auto-scaling and so forth through the distribution process application management screen I100.

Next, a computer system 1A according to the second embodiment will be described.

First, the outline of the computer system 1A according to the second embodiment will be described.

Figure 16:
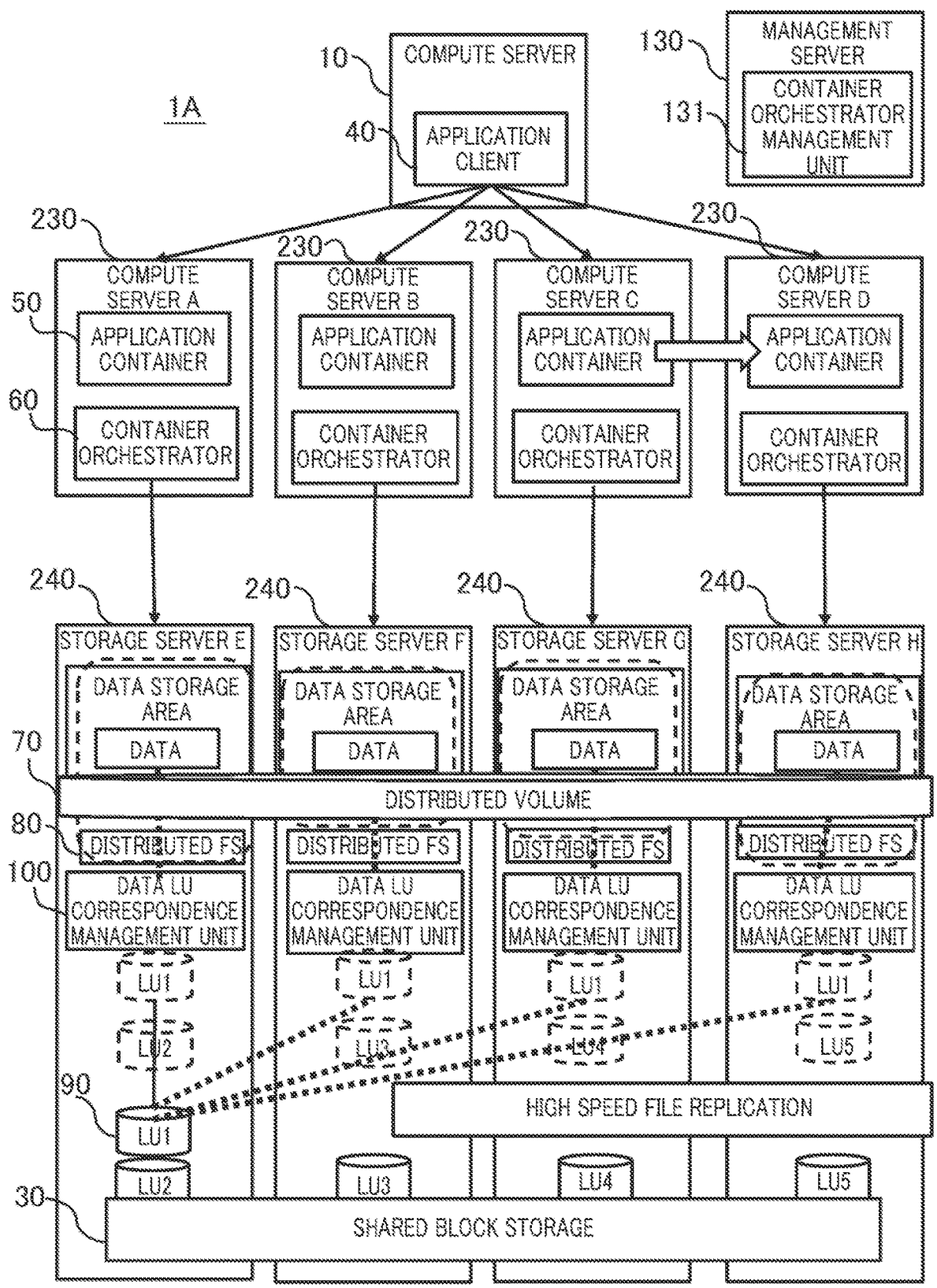
FIG. 16 is a diagram illustrating one example of an outline of a computer system according to the second embodiment.

FIG. 16 is a diagram illustrating one example of the outline of the computer system 1A according to the second embodiment. That is, FIG. 16 is the diagram for description of the outline of a method of auto-scaling the application container 50 in the computer system 1A according to the second embodiment. Incidentally, in the description of the second embodiment, the same sign is assigned to a constitutional element which is the same the constitutional element in the computer system 1 according to the first embodiment.

In the computer system 1A according to the second embodiment, a storage server 240 functions as both a block storage and a file storage.

The computer system 1A has the client server 10, a plurality (four in the example in FIG. 16) of compute servers 230 (compute servers A to D), a plurality (four in the example in FIG. 16) of the storage servers 240 (storage servers E to H) and the management server 130.

The compute server 230 has the container orchestrater 60. Here, before execution of the auto-scaling, three compute servers 230 (the compute servers A to C) have the application containers 50 which execute the same application and the compute server 230 (the compute server D) has no application container 50 which executes the same application.

The application container 50 executes the application and thereby executes a process on data which is allocated from the application, client 40. The container orchestrater 60 manages the application container 50.

The storage server 240 has the distributed file system 80 and the data LU correspondence management unit 100. The plurality of storage servers 240 configure the shared block storage 30 by the storage devices 140 that the respective storage servers 240 have. The distributed file system 80 prepares the distributed volume 70 which strides over the plurality of storage servers 240 by using the plurality of LUs 90 which are prepared in a storage area of the shared block storage 30. It is possible for the distributed file system 80 to prepare the plurality of the LUs 90 in the storage area of the shared block storage 30. A data storage area of the container orchestrater 60 of each compute server 230 is provided on the distributed volume 70 and the files that the application container 50 utilizes are stored in that data storage area. The data LU correspondence management unit 100 manages the LU 90 that the file that the application container 50 uses is stored.

In the computer system 1A, the container orchestrater 60 monitors a resource of the compute server 230. For example, in a case where the container orchestrater management unit 131 detects that the resource of the CPU 160 is tight, the container orchestrater management unit 131 executes the auto-scaling of the application containers 50. Specifically, the container orchestrater management unit 131 newly adds the application container 50 to the compute server 230 (in FIG. 1, the compute server D). Thereby, the load on each application container 50 is distributed.

In a case of executing the auto-scaling, in the computer system 1A, the container orchestrater management unit 131 specifies the LU 90 that a file is stored, in advance, to be used by the added application container 50. Then, the container orchestrater management unit 131 makes the compute server 230 which has the added application container 50 connect to the specified LU 90 which is located on the shared block storage 30, for example, in the read only state. Thereby, it becomes possible for the added application container 50 to use the data in that LU 90 without copying the data and thereby it becomes possible to realize the file replication at a high speed.

Next, the compute server 230 will be described.

Figure 17:
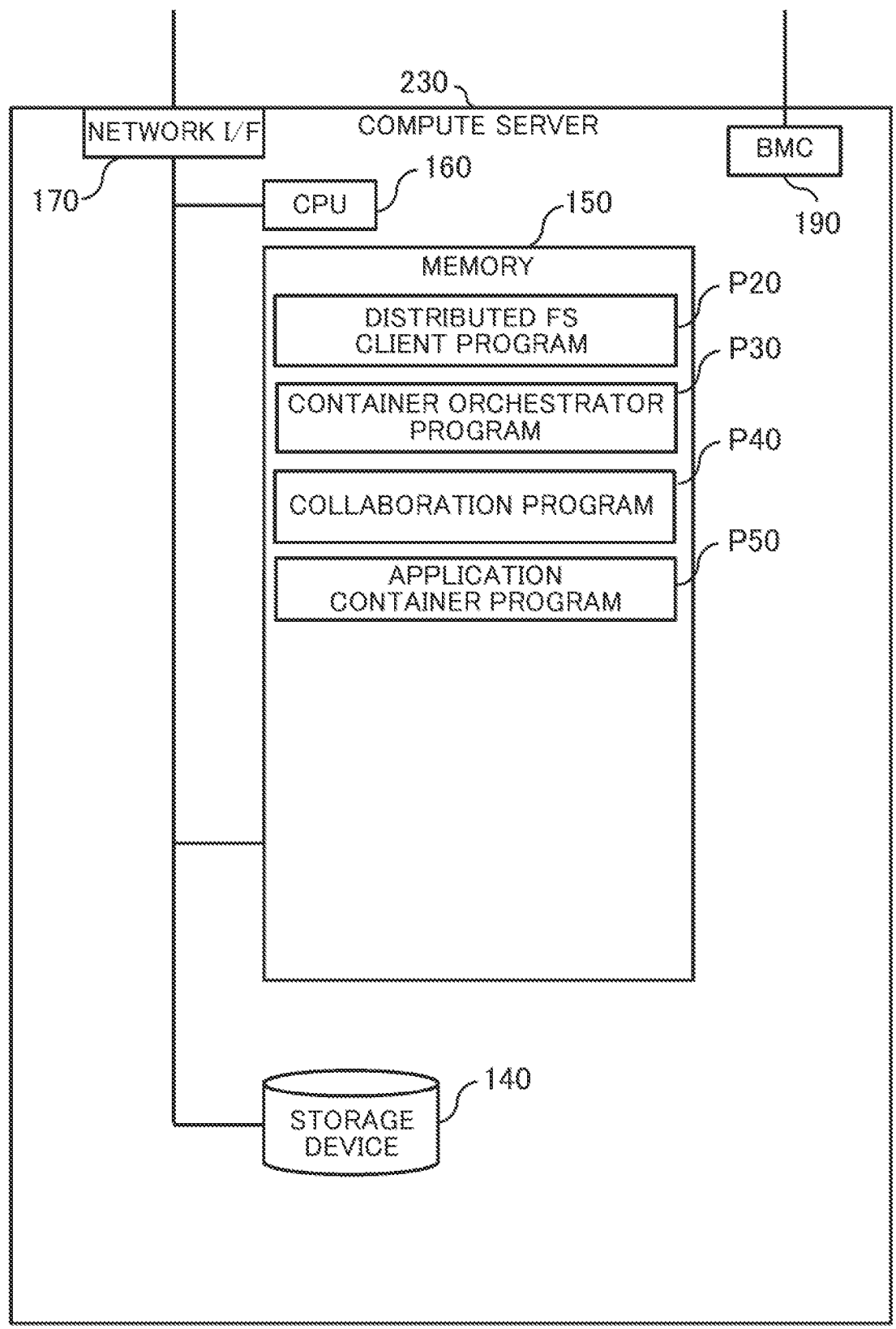
FIG. 17 is a configuration diagram illustrating one example of a configuration of a compute server pertaining to the second embodiment.

FIG. 17 is a configuration diagram illustrating one example of the configuration of the compute server 230 pertaining to the second embodiment.

The compute server 230 has the CPU 160 which is given as one example of the processor, the memory 150, the network interface 170, the storage device 140 and the BMC 190. The CPU 160, the memory 150, the network interface 170 and the storage device 140 are mutually connected via the internal bus 180.

The memory 150 of the compute server 230 stores the distributed FS client program P20, the container orchestrater program P30, the collaboration program P40 and the application container program P50.

The distributed FS client program P20 works to mount the distributed volume 70 which is located under the storage server 240 on the application container 50 of the compute server 230.

Next, the storage server 240 will be described.

Figure 18:
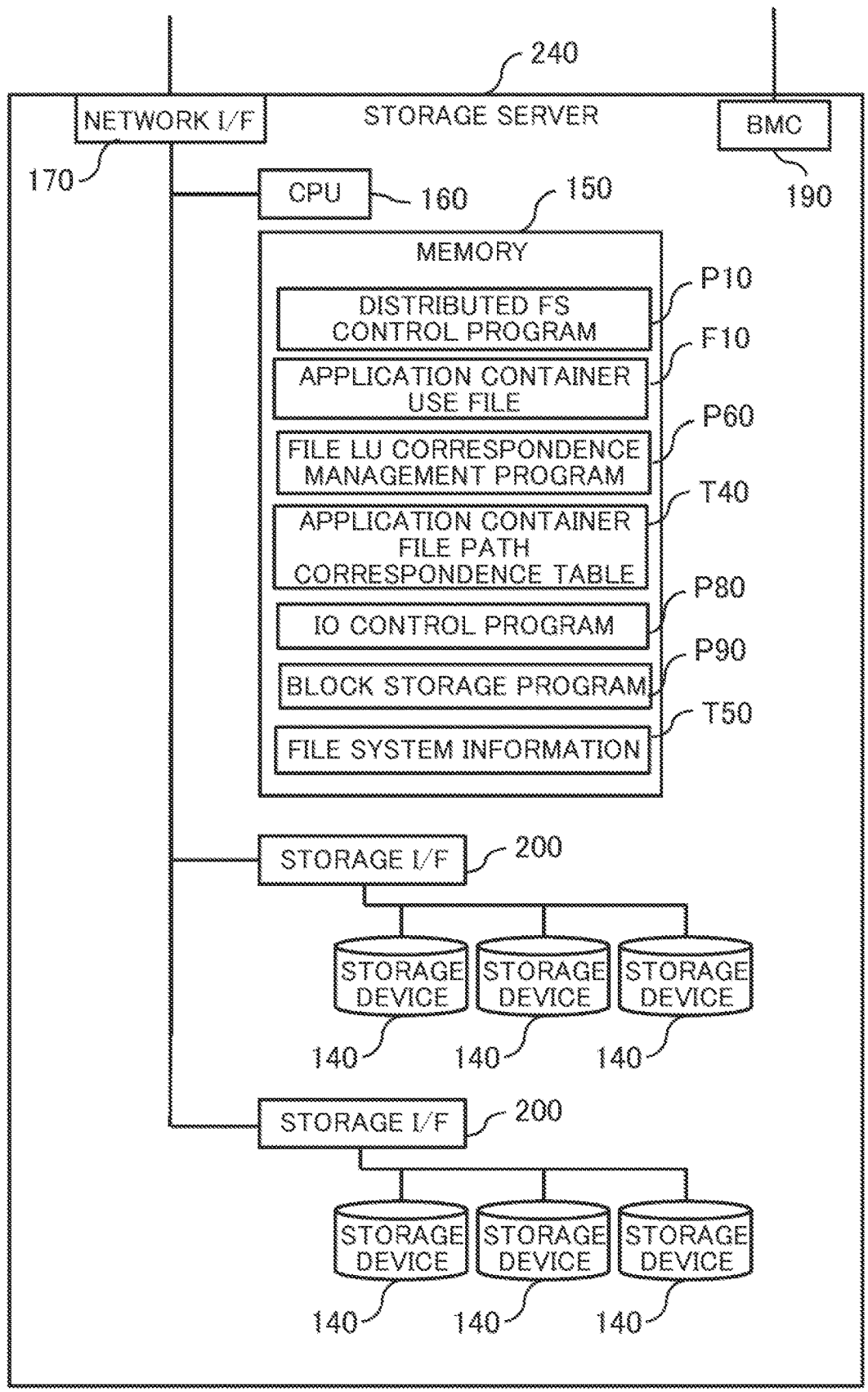
FIG. 18 is a configuration diagram illustrating one example of a configuration of a storage server pertaining to the second embodiment.

FIG. 18 is a configuration diagram illustrating one example of the configuration of the storage server 240 pertaining to the second embodiment.

The storage server 240 has the CPU 160 which is given as one example of the processor, the memory 150, the network interface 170, one or more storage interface(s) 200, the plurality of storage devices 140 and the BMC 190. The CPU 160, the memory 150, the network interface 170 and the storage interface(s) 200 are mutually connected via the internal bus 180.

The memory 150 of the storage server 240 stores the distributed FS control program P10, the application container use file F10, the file LU correspondence management program P60, the application container file path correspondence table T40, the IO control program P80, the block storage program P90 and the file system information T150.

Next, processing operations that the computer system 1A according to the second embodiment executes will be described. Incidentally, in the processing operations that the computer system 1A according to the second embodiment executes, description of the processing operation which is the same as the processing operation that the computer system 1 according to the first embodiment executes is omitted in some cases.

The scaling-out processing that the computer system 1A executes is the same as the scaling-out processing according to the first embodiment which is illustrated in FIG. 11.

Next, the reference LU specification process in step S130 will be described.

Figure 19:
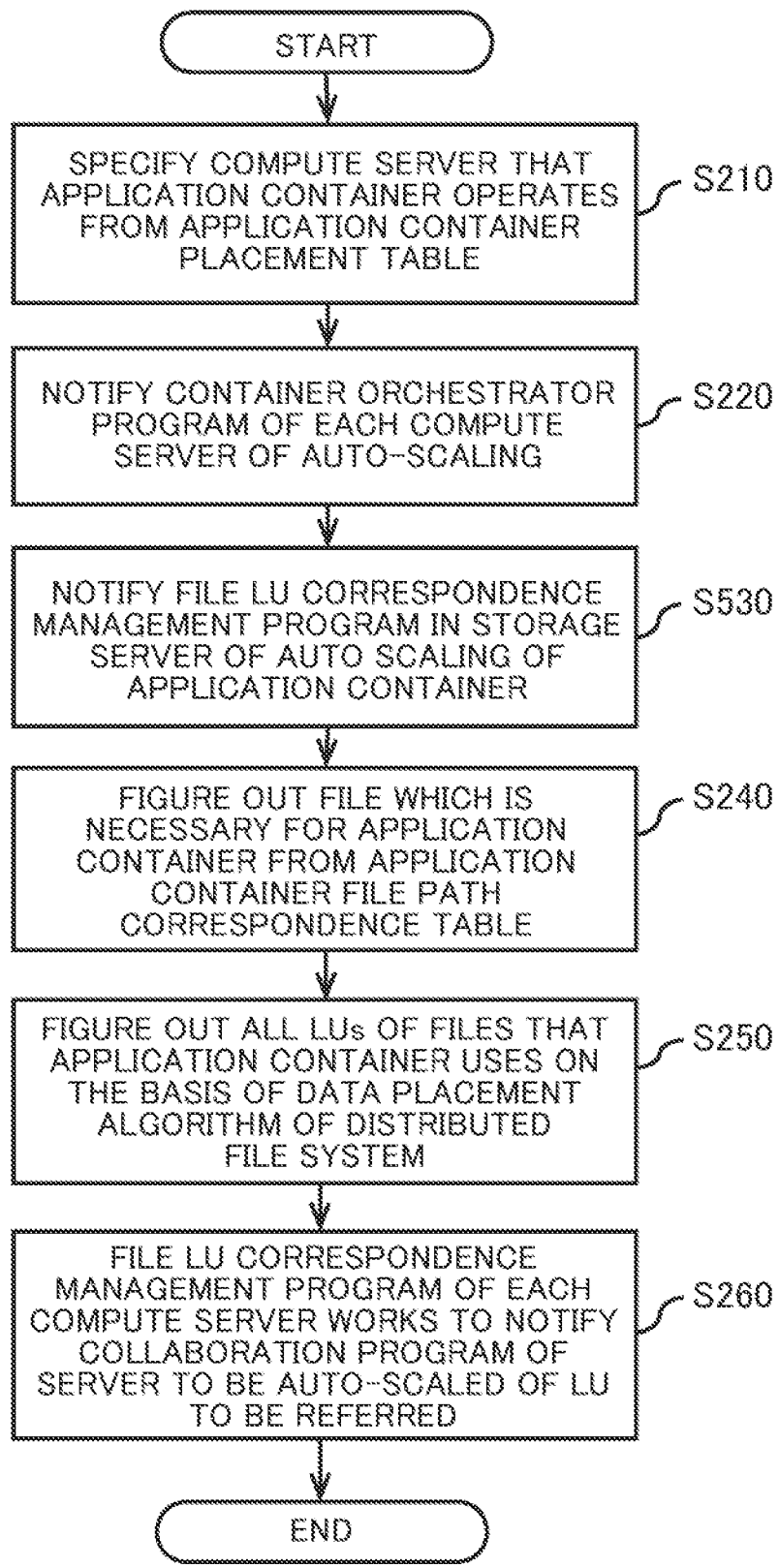
FIG. 19 is a flowchart illustrating one example of a reference LU specification process pertaining to the second embodiment.

FIG. 19 is a flowchart illustrating one example of the reference LU specification process pertaining to the second embodiment.

After execution of the process in step S220, the container orchestrater program P30 of each compute server 230 works to notify the file LU correspondence management program P60 of the storage server 240 of auto-scaling of the application containers 50 (step S530).

Next, the file high-speed replication process in step S140 will be described.

Figure 20:
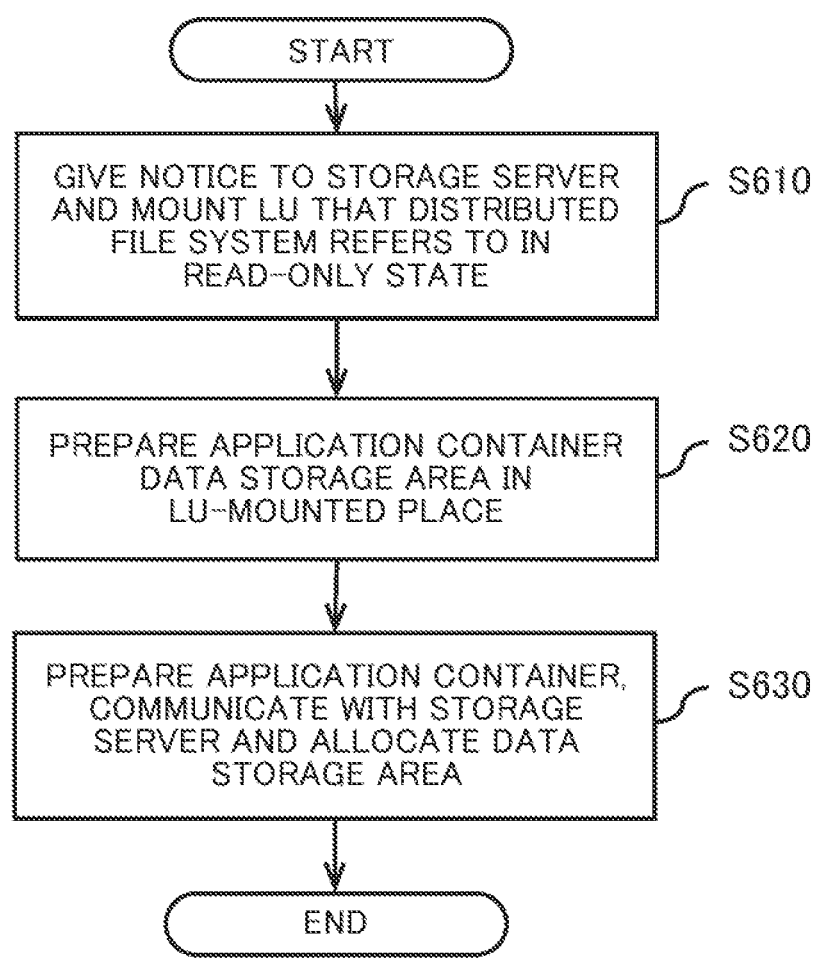
FIG. 20 is a flowchart illustrating one example of a file high-speed replication process pertaining to the second embodiment.

FIG. 20 is a flowchart illustrating one example of the file high-speed replication process pertaining to the second embodiment.

The collaboration program P40 of the compute server 230 which operates the application container 50 to be scaled out works to receive a notification which is given in step S260, to notify the storage server 240 of the LU 90 which is instructed to refer to in the notification and to mount the instructed LU 90 on the storage server 240 in the read only state (step S610). The distributed FS control program P10 of the storage server 240 works to receive the instruction and to make the instructed LU 90 which is located on the shared block storage 30 connect to the storage server 240 in the read only state.

Then, the collaboration program P40 works to transmit an instruction to set a place that the LU 90 is mounted in step 3610 as a new data area (volume) that the application container 50 is file-accessible to the storage server 240. The distributed FS control program P10 of the storage server 240 works to receive the instruction and to set the place that the LU 90 is mounted as the new data area (volume) that the application container 50 is file-accessible (step S620).

Then, the collaboration program P40 works to prepare the application container 50, to instruct to the distributed FS control program P10 of the storage server 240 and to allocate the new data area which is set in step S320 to the application container 50 (step S630). Thereby, it becomes possible for the application container 50 to refer to the LU 90 that the file to be used is stored via the new data area in the read only state and to execute the process which is allocated from the application client 40.

Next, the distributed volume preparation process will be described.

FIG. 21 is a flowchart illustrating one example of the distributed volume preparation process pertaining to the second embodiment.

The collaboration program P40 of the compute server 230 works to notify the distributed FS control program P10 of the storage server 120 so as to add (mount) the prepared LU 90 to (on) the distributed file system 80. Then, the distributed FS control program P10 which receives the notification works to add the prepared LU 90 to the distributed file system 80 (step S730). Then, the collaboration program P40 works to prepare the distributed volume 70 and to add the entry of the prepared distributed volume 70 to the distributed volume management table T10 (step S740).

Incidentally, the present invention is not limited to the above embodiments and it is possible to embody the invention by appropriately altering the configuration within a range not deviating from the gist of the present invention.

For example, although, in the above embodiments, the example that the application is executed by the application container 50 is presented, the present invention is not limited thereto and, for example, the application may be executed by the VM (one example of the execution unit).

In addition, some of or all the processes that the CPU 160 executes in the above embodiments may be executed by a hardware circuit. In addition, the programs in the above embodiments may be installed from a program source. The program source may be a program dispatch server or a storage medium (for example, a portable storage medium).

What is claimed is:

1. A computer system comprising:
 a plurality of compute server;
 a plurality of storage servers;
 a plurality of execution units that are each respectively executed on one of the plurality of compute servers, wherein each execution unit executes a particular application that requires data to execute; and
 a management server which manages the plurality of compute servers and the plurality of storage servers to allocate the plurality of execution units among the plurality of compute servers, wherein the management server is configured to:
 determine that an additional instance of a particular execution unit is required to execute the particular application, and
 in response to determining that the additional instance of the particular execution unit is required:
 determine a particular logic unit that stores the data required for the particular application, wherein the particular logic unit is stored on a particular storage server among the plurality of storage servers,
 replicate the particular logic unit from the particular storage server to another storage server among the plurality of storage servers to form a replicated logic unit,
 create the additional instance of the particular execution unit on another compute server amongst the plurality of compute servers, and
 set the additional instance of the particular execution unit to refer to the replicated logic unit.

2. The computer system according to claim 1, wherein the another storage server among the plurality of storage servers is selected in accordance with a predetermined algorithm.

3. The computer system according to claim 2, wherein the predetermined algorithm is an algorithm includes a hash value which relates to information which contains a name of the particular logic unit.

4. The computer system according to claim 1, wherein the plurality of execution units are each a container which is configured on an OS of a respective compute server.

5. The computer system according to claim 1, wherein the management server is further configured to:
allocate a plurality of logic units to one block device and generates the logic unit such that a data volume of the logic unit becomes less than a predetermined volume.

6. The computer system according to claim 1, wherein the management server
outputs at least either load information or performance information on a resource of a respective server amongst the plurality of the compute servers that executes the particular execution unit.

7. The computer system according to claim 1, wherein the management server is further configured to:
output information which indicates performances of all of the plurality of the compute servers prior to creating the additional instance of the particular execution unit and after creating the additional instance of the particular execution unit.

8. A scale-up management method, the method comprising:
determining, by a management server, that an additional instance of a particular execution unit is required to execute a particular application; and
in response to determining that the additional instance of the particular execution unit is required:
determining, by the management server, a particular logic unit that stores data required for the particular application, wherein the particular logic unit is stored on a particular storage server among a plurality of storage servers,
replicating, by the management server, the particular logic unit from the particular storage server to another storage server among the plurality of storage servers to form a replicated logic unit,
creating, by the management server, the additional instance of the particular execution unit on another compute server amongst a plurality of compute servers, and
setting, by the management server, the additional instance of the particular execution unit to refer to the replicated logic unit.

* * * * *